(12) United States Patent
Duncanson

(10) Patent No.: US 11,447,191 B2
(45) Date of Patent: Sep. 20, 2022

(54) AERODYNAMIC PANEL APPARATUS MOUNTABLE BEHIND TRUCK CAB

(71) Applicant: Volvo Truck Corporation, Gothenburg (SE)

(72) Inventor: William Edward Duncanson, Walnut Cove, NC (US)

(73) Assignee: Volvo Truck Corporation, Gothenburg (SE)

(*) Notice: Subject to any disclaimer, the term of this patent is extended or adjusted under 35 U.S.C. 154(b) by 253 days.

(21) Appl. No.: 17/010,005

(22) Filed: Sep. 2, 2020

(65) Prior Publication Data

US 2021/0070378 A1   Mar. 11, 2021

Related U.S. Application Data

(60) Provisional application No. 62/896,007, filed on Sep. 5, 2019.

(51) Int. Cl.
B62D 35/00 (2006.01)
(52) U.S. Cl.
CPC ................. B62D 35/001 (2013.01)
(58) Field of Classification Search
CPC .................................................. B62D 35/001
See application file for complete search history.

(56) References Cited

U.S. PATENT DOCUMENTS

| | | |
|---|---|---|
| 4,518,188 A | 5/1985 | Witten |
| 4,746,160 A | 5/1988 | Wiesemeyer |
| 4,750,772 A | 6/1988 | Haegert |
| 4,904,015 A | 2/1990 | Haines |
| 5,078,448 A | 1/1992 | Selzer et al. |
| 5,658,038 A | 8/1997 | Griffin |
| 6,428,084 B1 | 8/2002 | Liss |
| 8,403,401 B2 | 3/2013 | Rinehart et al. |
| 9,555,841 B1 | 1/2017 | Roush |
| 9,656,698 B2 | 5/2017 | Smith |
| 10,214,253 B2 | 2/2019 | Smith |
| 2011/0042998 A1 | 2/2011 | Rinehart et al. |
| 2011/0148140 A1* | 6/2011 | Benton ............... B62D 35/001 296/180.1 |
| 2012/0223544 A1* | 9/2012 | Benton ............... B62D 35/001 296/180.1 |
| 2015/0321706 A1 | 11/2015 | Smith |
| 2016/0194037 A1 | 7/2016 | Logounov |

* cited by examiner

*Primary Examiner* — Lori L Lyjak
(74) *Attorney, Agent, or Firm* — Withrow & Terranova, PLLC

(57) ABSTRACT

Aspects of the disclosure relate to an aerodynamic panel apparatus mountable to a truck cab. A panel apparatus includes a fixed panel, a moveable panel extender arranged rearward of the fixed panel, and a hinge mechanism. When aligned, the fixed panel and moveable panel extender guide an air flow past side walls of a cab and a trailer for improved aerodynamics and enhanced vehicle performance. The hinge mechanism enables pivotal movement of the moveable panel extender outboard from a closed position. The pivotal movement provides back of cab accessibility, while outboard movement avoids interference with items located in the back of cab area, and provides easy access to a handle bar arranged along an inner surface of the fixed panel. The moveable panel extender includes a resiliently deformable material that may be temporarily deformed during trailer articulation but returned to its original shape thereafter.

21 Claims, 18 Drawing Sheets

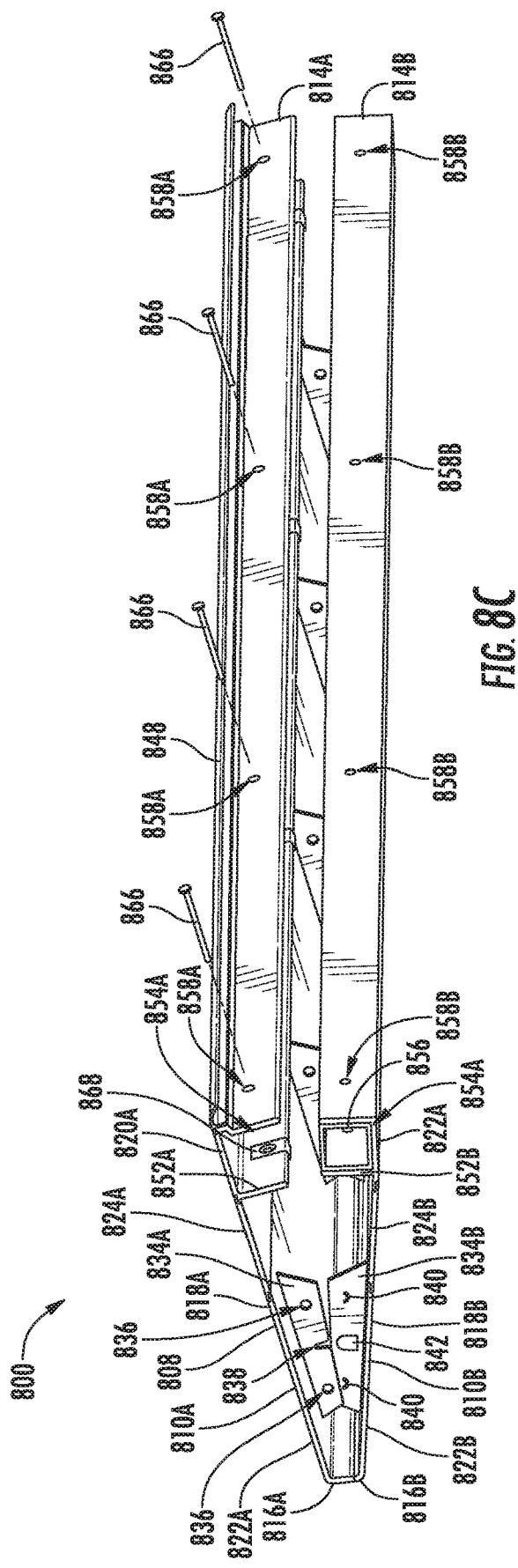

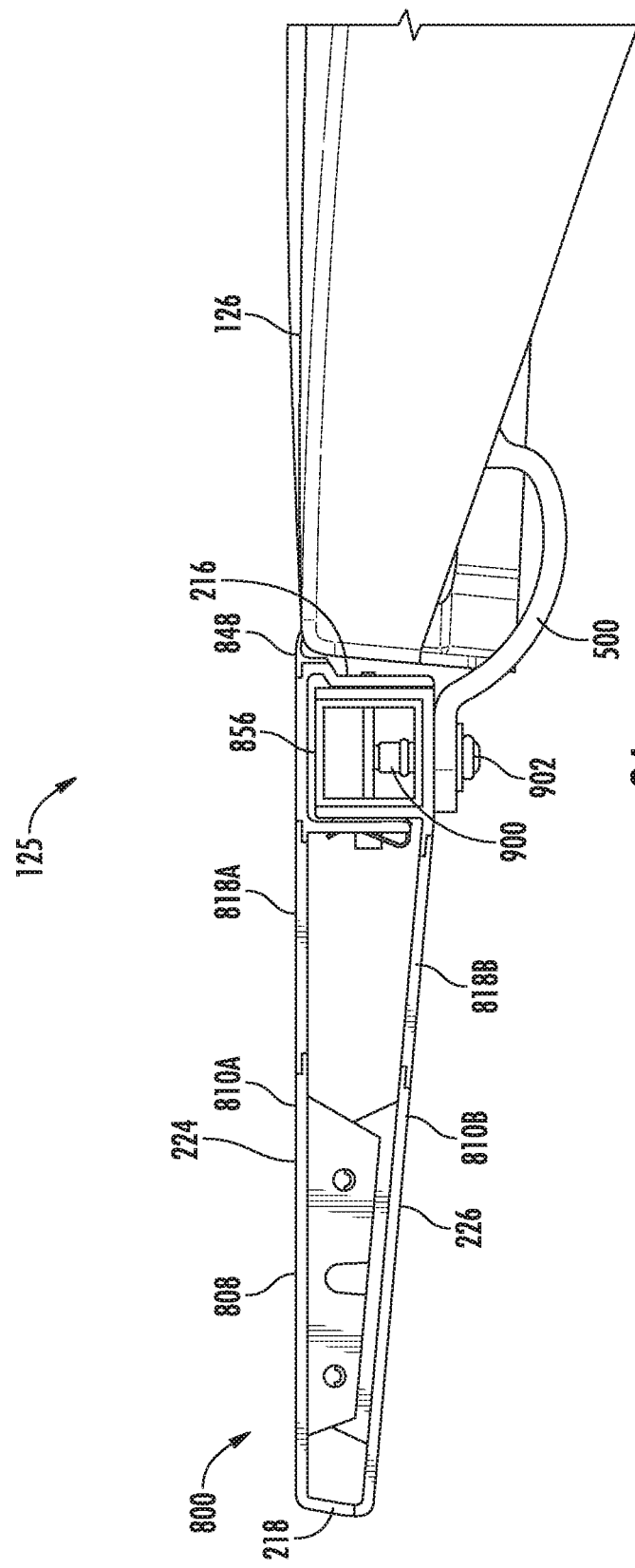

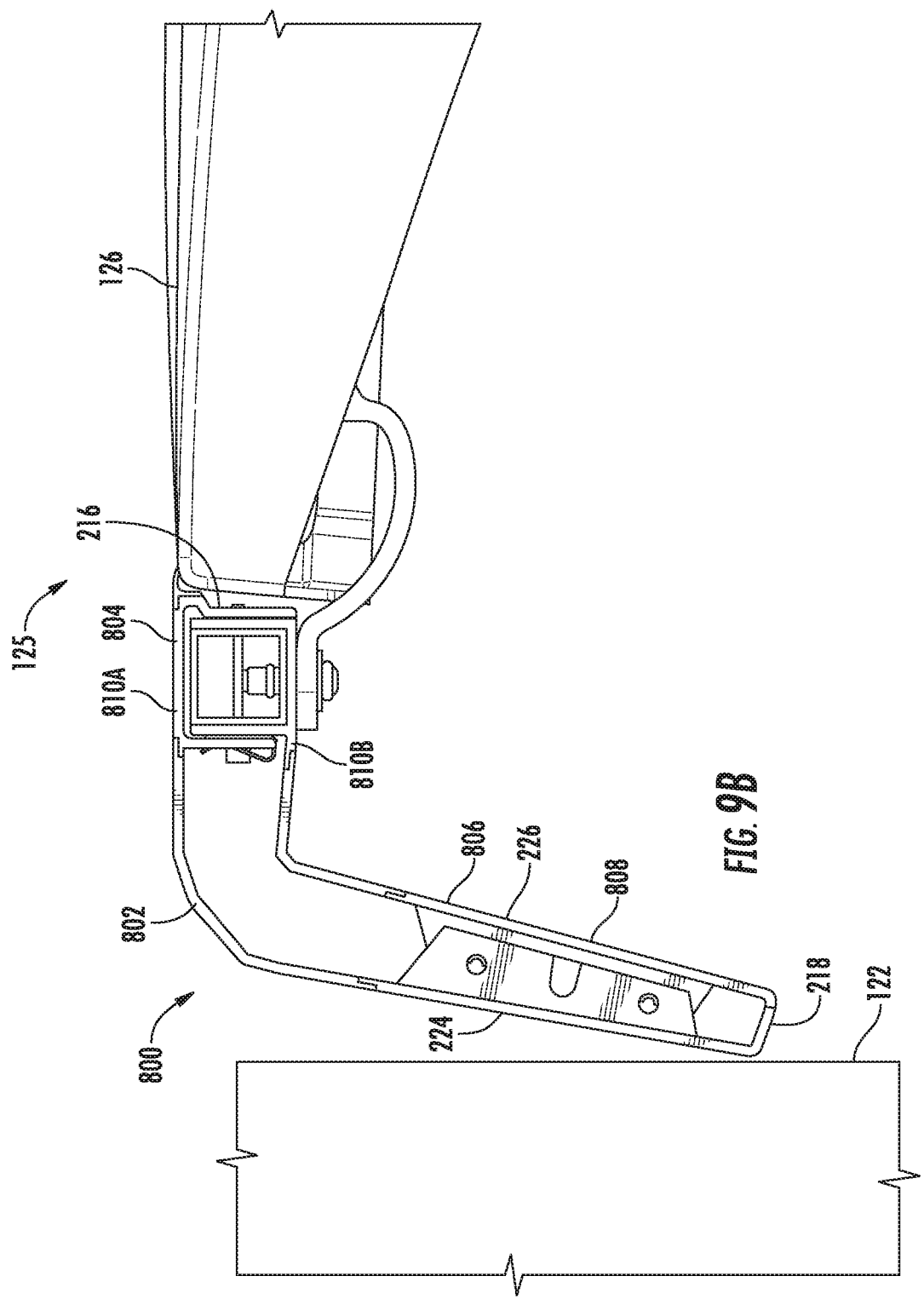

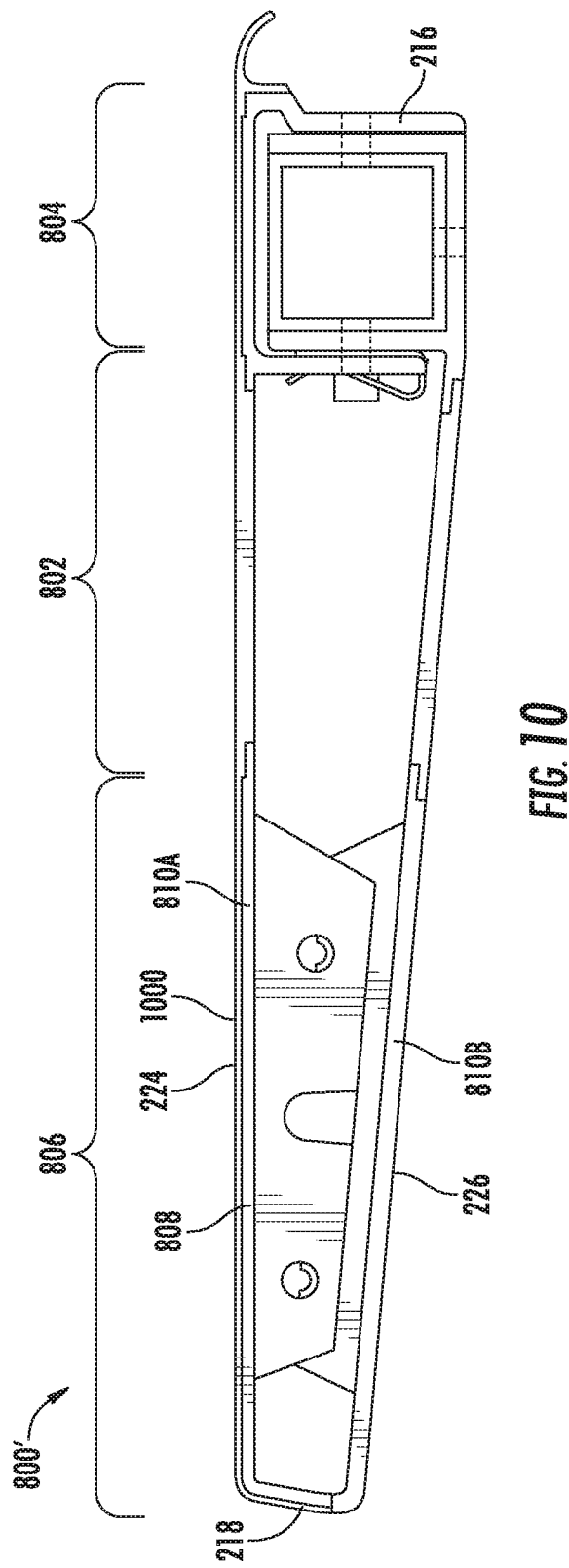

AERODYNAMIC PANEL APPARATUS MOUNTABLE BEHIND TRUCK CAB

PRIORITY APPLICATION

This application claims the benefit of priority under 35 U.S.C. § 119(e) of U.S. Provisional Application No. 62/896,007 filed Sep. 5, 2019, entitled "AERODYNAMIC PANEL APPARATUS MOUNTABLE BEHIND TRUCK CAB," the content of which is relied upon and incorporated herein by reference in its entirety.

FIELD OF THE DISCLOSURE

The disclosure relates generally to truck cab fairings. In particular aspects, the disclosure relates to a resiliently deformable moveable panel extender configured to improve aerodynamic performance and permit trailer articulation, and that is pivotable in an outboard direction to facilitate back of cab access.

BACKGROUND

Semi-trailer trucks usually include clearance space between the cab and the trailer to provide back of cab access (BOCA) and to avoid interference when the tractor is turned relative to the trailer. This gap between the cab and the trailer can create significant drag at highway speeds as the air moves around the cab and into the space between the cab and the trailer, reducing fuel economy.

Some trucks include panels extending rearward from side walls of a truck cab to partially close at least part of the gap between the cab and the trailer. However, such panels are typically much shorter than the actual gap in order to provide clearance between the tractor and trailer when the tractor engages in tight turns and pivots relative to the trailer, possibly in conjunction with trailer roll. As a result, these conventional panels only partially mitigate the aerodynamic issues associated with the gap between the cab and the trailer.

Other conventional panel extenders that may completely fill the gap between a cab and a trailer may detrimentally inhibit back of cab access and/or exhibit other drawbacks. For example, some panel extenders may be difficult to mount and demount, may be difficult to open and close, may not be aerodynamically optimized, etc. One example of a conventional arrangement is shown in U.S. Pat. No. 9,656,698, which provides a cab fairing having portions that are moveable between a first state suitable for low speed conditions and a second state suitable for cruising speed conditions. Such panel extenders may include actuators for deployment of panel portions between different operating states. In the cruising speed operating state, the panel extenders extend rearward and outward to overlap a leading edge of a trailer, requiring significant panel length and widening the effective frontal area of the trailer.

SUMMARY

Aspects of the disclosure relate to an aerodynamic panel apparatus mountable behind a truck cab. An exemplary panel apparatus includes a fixed panel, a moveable panel extender arranged rearward of the fixed panel, and a hinge mechanism mounting the moveable panel extender to the fixed panel. When the fixed panel and the moveable panel extender are aligned, they close a majority of the gap between a cab and a trailer and guide an air flow past substantially vertical side surfaces of a cab to sides of a trailer for improved aerodynamics (e.g., reduced drag) and increased vehicle performance (e.g., improved fuel economy), relative to a semi-trailer truck lacking panel extenders. The hinge mechanism enables pivotal movement of the moveable panel extender from a closed position in which the moveable panel extender is substantially aligned with the fixed panel to an open position in which the moveable panel extender is pivoted outboard relative to the fixed panel. Pivotal movement of the moveable panel permits an operator to enter and exit a space behind the cab, thereby enhancing back of cab accessibility relative to fixed panel extenders. The outboard movement of the moveable panel extender avoids undesirable mechanical interference between the panel extender and items behind (e.g., hydraulic/pneumatic lines, cabling, etc.) and provides access to a handle bar arrangeable along an inner surface of the fixed panel to assist a user to access the back of the cab. In certain embodiments, the moveable panel extender includes a resiliently deformable material (e.g., a rubber material) to allow the moveable panel extender to contact the trailer when the tractor and trailer pivot relative to one another without risk of breakage. In such an instance, a resiliently deformable moveable panel extender may contact a trailer surface and be temporarily deformed or deflected, but the shape of the moveable panel extender will be restored when contact with the trailer ends.

In one aspect, a panel apparatus is configured to be mounted behind a cab of a truck. The panel apparatus includes a fixed panel, a moveable panel extender arranged rearward of the fixed panel, and a hinge mechanism configured to enable pivotal movement of the moveable panel extender from a closed position in which the moveable panel extender is substantially aligned with the fixed panel to an open position in which the moveable panel extender is pivoted outboard relative to the fixed panel. The fixed panel and the hinge mechanism are configured to be supported by a plurality of structural supports attached to a rear wall of the cab, with the fixed panel being immovable relative to the cab.

In certain embodiments, a combined length of the fixed panel and the moveable panel extender is less than a length of a gap between the cab of the truck and a trailer of the truck when the cab and the trailer are aligned.

In certain embodiments, the fixed panel includes a rigid material and the moveable panel extender comprises a resiliently deformable material. In certain embodiments, the fixed panel includes a plastic material. In certain embodiments, the resiliently deformable material includes rubber. In certain embodiments, the rubber includes at least one of a thermoplastic elastomer (TPE), a thermoplastic vulcanizate (TPV), and a thermoplastic olefin (TPO).

In certain embodiments, the moveable panel extender includes an extruded material. In certain embodiments, at least a portion of a cross-section of the moveable panel extender is hollow. In certain embodiments, a first portion of the moveable panel extender includes a first material and a second portion of the moveable panel extender includes a second material. The second material has a greater rigidity than the first material.

In certain embodiments, the moveable panel extender has a length of about 20 cm to about 40 cm. In certain embodiments, the fixed panel has a first length extending from a first end of the fixed panel opposite the hinge mechanism to a second end of the fixed panel proximate to the hinge mechanism. The moveable panel extender has a second length extending from a first end of the moveable panel proximate to the hinge mechanism to a second end of the moveable panel opposite the hinge mechanism. The first length is in a range of from about 50% to about 150% of the second length.

In certain embodiments, the fixed panel includes a lower portion and an upper portion. The moveable panel extender is attached to the lower portion and not attached to the upper portion. In certain embodiments, the moveable panel extender has a height that is greater than a height of the lower portion of the fixed panel. In certain embodiments, the panel apparatus further includes a fixed panel extender that includes a resiliently deformable material. The moveable panel extender includes the resiliently deformable material. In certain embodiments, the fixed panel extender and the moveable panel extender have a same length and differing heights.

In certain embodiments, the hinge mechanism includes a gooseneck hinge. In certain embodiments, the hinge mechanism is attached to an inner surface of the fixed panel and to an inner surface of the moveable panel extender.

In certain embodiments, the panel extender includes a metal spine at a frontward section. In certain embodiments, the metal spine includes a hollow tube with a rectangular cross-section.

In certain embodiments, the body of the panel extender further includes an outer wall, an inner wall, and at least one hollow portion positioned between the outer wall and the inner wall.

In another aspect, any one or more aspects or features described herein may be combined with any one or more other aspects or features for additional advantage.

Other aspects and embodiments will be apparent from the detailed description and accompanying drawings.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 8C is a perspective view of the moveable panel extender of FIG. 8A in an open configuration during assembly thereof, showing a direction of insertion of fasteners;

FIG. 9A is a top plan view of another embodiment of the panel apparatus of FIGS. 1-2B with the moveable panel extender of FIG. 8A;

FIG. 9B is a top plan view of the panel apparatus of FIG. 9A illustrating deformation of the moveable panel extender due to trailer swing;

FIG. 10 is a top plan view of another embodiment of the moveable panel extender of FIG. 8A with addition of a skin on exterior surface portions thereof;

DETAILED DESCRIPTION

Figure 1:
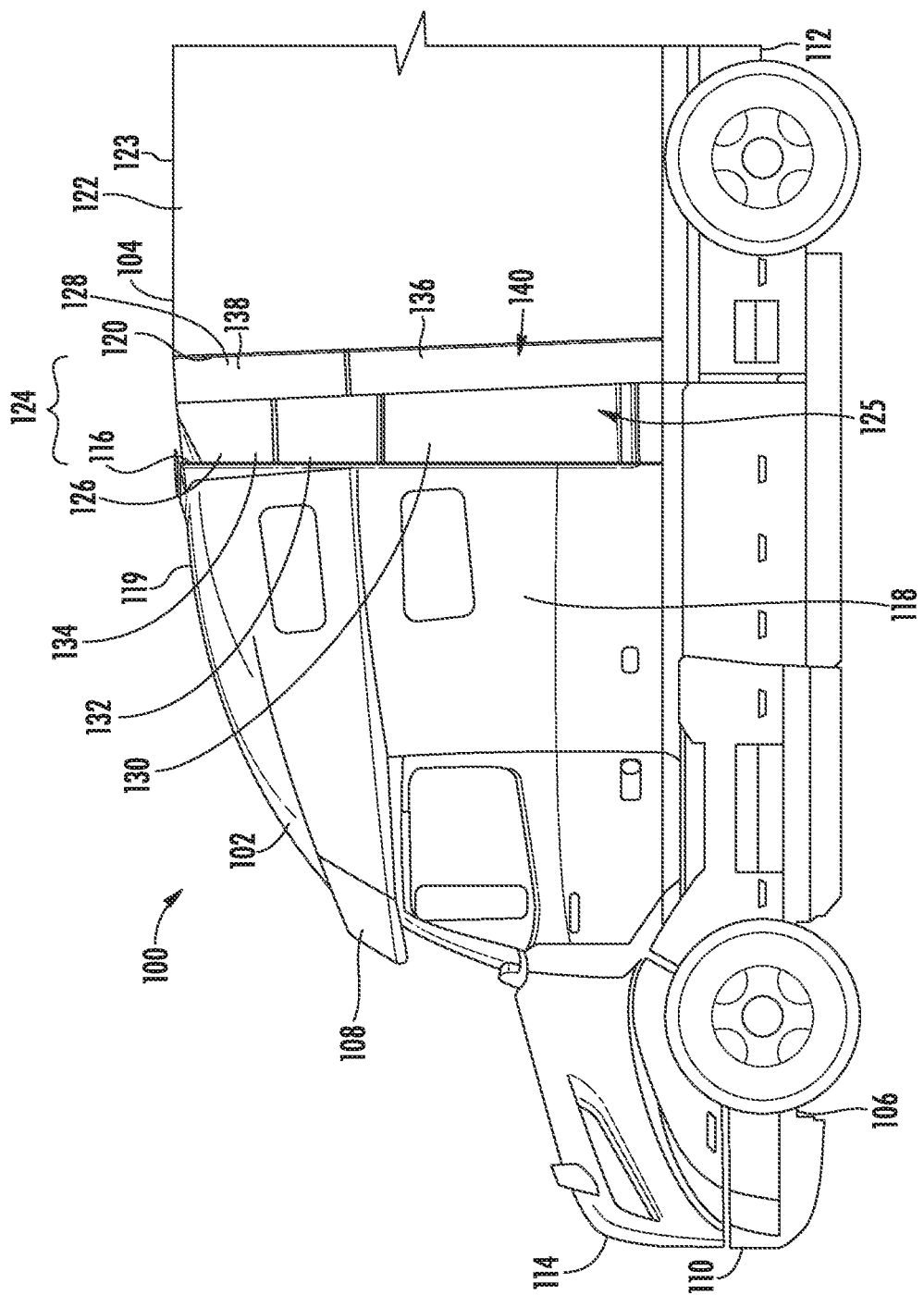
FIG. 1 is a side elevational view of a semi-trailer motor vehicle with a panel apparatus positioned between a cab and a trailer, the panel apparatus including an aerodynamic panel apparatus mountable behind the truck cab.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

FIG. 1 illustrates a tractor-trailer combination vehicle 100 including a truck 102 (which may also be referred to as a tractor, tractor unit, etc.) and a trailer 104 (which may also be referred to as a semi-trailer) attached to and pulled by the truck 102. The truck 102 and the trailer 104 are shown in an aligned orientation for normal forward movement. The truck 102 includes a frame 106 (which may also be referred to herein as a chassis) and a cab 108 (which may also be referred to herein as truck cab) mounted on the frame 106. Although only one side of the tractor-trailer 100 is shown, it is to be understood that the same features may be provided on both sides of the tractor-trailer 100, unless otherwise noted.

The frame 106 includes a front portion 110 and a rear portion 112, with the cab 108 attached to a top of the front portion 110 of the frame 106, and the trailer 104 pivotally coupled to a fifth wheel (not illustrated) mounted on a top of the rear portion 112 of the frame 106. The cab 108 includes a front 114, a rear wall 116 (opposite the front 114), and sidewalls 118 extending therebetween, as well as a top 119. The trailer 104 includes a front 120, sidewalls 122, and a top 123. The trailer 104 attaches to the truck 102 such that the trailer 104 can pivot about a vertical axis (see FIGS. 7A and 7B) relative to the cab 108. The vertical axis extends through the top 123 of the trailer 104. Further, the sidewalls 118 of the cab 108 are generally aligned with the sidewalls 122 of the trailer 104 when in a straight orientation (i.e., when the cab 108 is aligned with the trailer 104).

A gap 124 (corresponding in location to a back of cab area) is defined between the rear wall 116 (which may also be referred to as a back wall, etc.) of the cab 108 and the front 120 of the trailer 104. In certain embodiments, the gap 124 length is in a range of from 18 to 24 inches (45.7 to 61 cm). This gap 124 provides back of cab access (BOCA) to allow a user to get between the cab 108 and the trailer 104. Such BOCA may be required by the Federal Motor Carrier Safety Regulations (e.g., for access to air and/or electrical connections of the trailer 104). The gap 124 further provides clearance for pivoting movement of the cab 108 relative to the trailer 104 about the vertical axis.

A panel apparatus 125 (which may also be referred to as an aerodynamic panel apparatus) is configured to be mounted behind the cab 108 of the truck 102 (e.g., to the rear wall 116 of the cab 108). The panel apparatus 125 is positioned within the gap 124 between the cab 108 and the trailer 104, and extends between the rear wall 116 of the cab 108 and the front 120 of the trailer 104. This closes a substantial portion of the gap 124 between the cab 108 and the trailer 104 thereby improving aerodynamic performance while also providing BOCA (among other advantages).

The panel apparatus 125 includes a fixed panel 126 (which may also be referred to herein as a fixed panel deflector, fixed fairing, etc.) and a resiliently deformable panel extender 128 pivotable in an outboard direction. It is noted that only one panel apparatus 125 is shown on one side of the tractor-trailer 100, but that another panel apparatus 125 is similarly mounted on the other side of the tractor-trailer 100.

The fixed panel 126 and panel extender 128 are both approximately the height of the cab 108 and/or the trailer 104. Further, the fixed panel 126 and the panel extender 128 together extend about the length of the gap 124 substantially closing the gap 124. Accordingly, in certain embodiments, the fixed panel 126 may have a length in a range of about 6 to 12 inches (15.2 to 30.5 cm), and/or the panel extender 128 may have a length in a range of about 6 to 12 inches (15.2 to 30.5 cm). As a result, the panel apparatus 125 provides a generally continuous surface spanning a majority of a distance between the sidewalls 118 of the cab 108 and the sidewalls 122 of the trailer 104 when in a closed orientation (which may also be referred to as a straight orientation). This deflects air from entering the gap 124, which would otherwise increase drag. In other words, the panel apparatus 125 guides an air flow along corresponding sidewalls 118 of the cab 108 to the sidewalls 122 of the trailer 104 for improved aerodynamics (e.g., reduced drag) and/or increased vehicle performance (e.g., improved fuel economy). In particular, the panel apparatus 125 provides a substantially seamless transition from the sidewalls 118 of the cab 108 to the sidewalls 122 of the trailer 104. It is noted that in the closed orientation, the panel extender 128 does not flare outward and/or contact the sidewalls 122 of the trailer 104. By positioning the fixed panel 126 and the panel extender 128 to align with the sidewalls 122 of the trailer 104, the panel apparatus 125 does not widen or otherwise enlarge the aerodynamic profile (frontal area) of the tractor-trailer 100.

In certain embodiments, the fixed panel 126 includes a lower portion 130, a middle portion 132, and/or an upper portion 134, although more or fewer portions may be used. In certain embodiments, the fixed panel 126 is made of a rigid material, such as metal (e.g., aluminum). In certain embodiments, the fixed panel 126 is made of a rigid plastic, such as a thermoplastic material and/or thermos-set material. In certain embodiments, the fixed panel 126 includes polycarbonate (PC) and/or acrylonitrile butadiene styrene (ABS).

The panel extender 128 includes a moveable panel extender 136 (which may also be referred to as a moveable panel extender portion, moveable fairing extender, etc.) and a fixed panel extender 138 (which may also be referred to as a fixed panel extender portion, upper portion, etc.), although additional or fewer portions may be provided. The moveable panel extender 136 and the fixed panel extender 138 are arranged rearward of the fixed panel 126. In certain embodiments, the moveable panel extender 136 and the fixed panel extender 138 have about the same length (horizontal, front to back) and differing heights (vertical, bottom to top). In certain embodiments, the moveable panel extender 136 has a height sufficient to provide head clearance to a user accessing the back of cab area, but not unduly large to avoid excess weight that would lead to difficulty in counteracting undesirable movement and/or vibration of the moveable panel extender 136 when the truck 102 is traveling at cruising speeds. Reducing the height of the moveable panel extender 136 reduces cantilever forces, vibrations, etc. For example, in certain embodiments, the moveable panel extender 136 has a height of about 65 inches (165 cm).

In certain embodiments, the panel extender 128 (e.g., moveable panel extender 136 and/or fixed panel extender 138) is formed by copolymer extrusion. In certain embodiments, the panel extender 128 (e.g., the moveable panel extender 136 and/or the fixed panel extender 138) includes a resiliently deformable material, such as rubber (e.g., a thermoplastic elastomer (TPE), a thermoplastic vulcanizate (TPV), and/or a thermoplastic olefin (TPO), etc.). In certain embodiments, the panel extender 128 (e.g., the moveable panel extender 136 and/or the fixed panel extender 138) includes or consists of an extruded material. In certain embodiments, the panel extender 128 includes a rigid material, such as metal (e.g., aluminum). In certain embodiments, the panel extender 128 includes a rigid plastic, such as a thermoplastic material and/or thermos-set material. In certain embodiments, the panel extender 128 includes polycarbonate (PC) and/or acrylonitrile butadiene styrene (ABS). In certain embodiments, the panel extender 128 may include a rigid material (e.g., as ribs) to provide structural support for a resiliently deformable material.

Fabricating at least a portion of the panel extender 128 of a resiliently deformable material allows the panel extender 128 to extend rearward into an articulation interference zone between the trailer 104 and the cab 108 without concern of breakage of the panel extender 128 (e.g., at least the moveable panel extender 136) due to interference with the trailer 104. As noted above, the fixed panel 126 is made of a rigid material (e.g., metal). Accordingly, a portion of the panel apparatus 125 is made of a rigid material and a portion is made of a resiliently deformable material. Fabrication of the fixed panel 126 from a rigid material provides structural rigidity with relatively low weight. The fixed panel 126 may be less susceptible to vibrating at high speeds, and may be thinner, cheaper to manufacture, and/or of a lighter weight than the panel extender 128. Accordingly, the lengths (e.g., from front to back) of the fixed panel 126 relative to the panel extender 128 are proportioned to facilitate articulation of the trailer 104 (e.g., by the size of deformation of the panel extender 128) and provide BOCA (e.g., by the size of the moveable panel extender 136), while also incorporating considerations of aerodynamic performance (e.g., because the fixed panel 126 may have better aerodynamic performance than the panel extender 128) and/or costs (e.g., because the fixed panel 126 may be cheaper to manufacture than the panel extender 128).

The moveable panel extender 136 is pivotally attached to the lower portion 130 of the fixed panel 126 (and not attached to the upper portion 134), thereby forming a subassembly 140 of the panel apparatus 125. The fixed panel extender 138 is attached to the upper portion 134 of the fixed panel 126. In this way, the height of the moveable panel extender 136 is greater than the height of the lower portion 130 of the fixed panel 126. In other words, the height of the moveable panel extender 136 is the same height as a combination of the lower portion 130 and middle portion 132 of the fixed panel 126. This simplifies manufacturability of the panel apparatus 125. However, in certain embodiments, the moveable panel extender 136 may be attached to the lower portion 130, the middle portion 132, and/or the upper portion 134.

In certain embodiments, the hinge mechanism 228 (see FIGS. 2A-2B below) may be provided only on the driver's side of the truck 102. A fixed attachment (which may be referred to as a non-pivotal attachment, non-moveable attachment, etc.) may be provided on the passenger side of the truck 102 to attach the panel extender 128 to the fixed panel 126. In such embodiments, only the driver's side of the truck 102 provides back of cab access. Further, in such embodiments, the panel extender 128 may be made of one single panel extender or multiple panel extenders. For example, in certain embodiments, the panel extender 128 on the passenger side of the truck 102 includes a lower panel extender (with a height of about 58 inches (147 cm)) and an upper panel extender. Separating the panel extender 128 into multiple pieces may facilitate assembly and make the multiple pieces easier to mount than one large single piece.

Figure 2A:
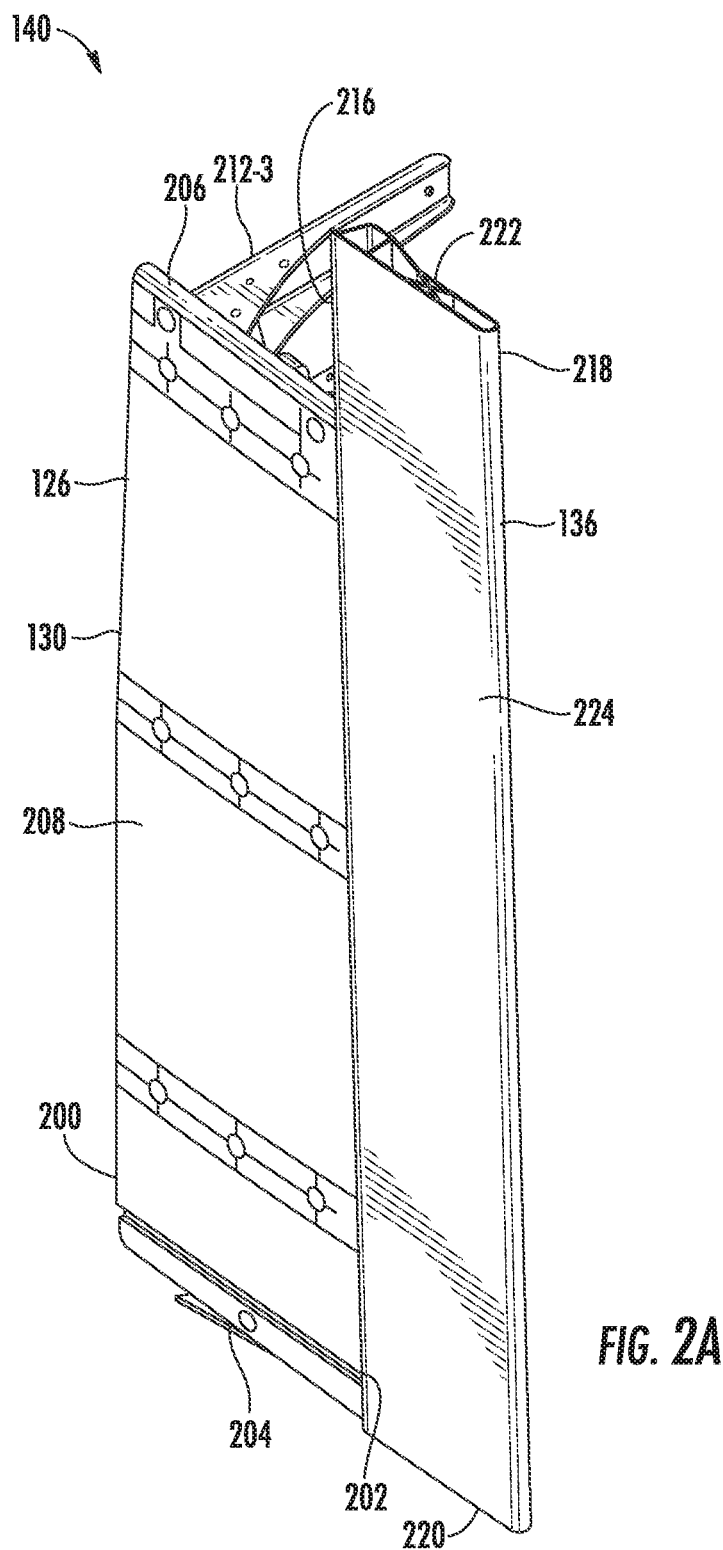
FIG. 2A is an outboard perspective view of the subassembly of the panel apparatus of FIG. 1.
Figure 2B:
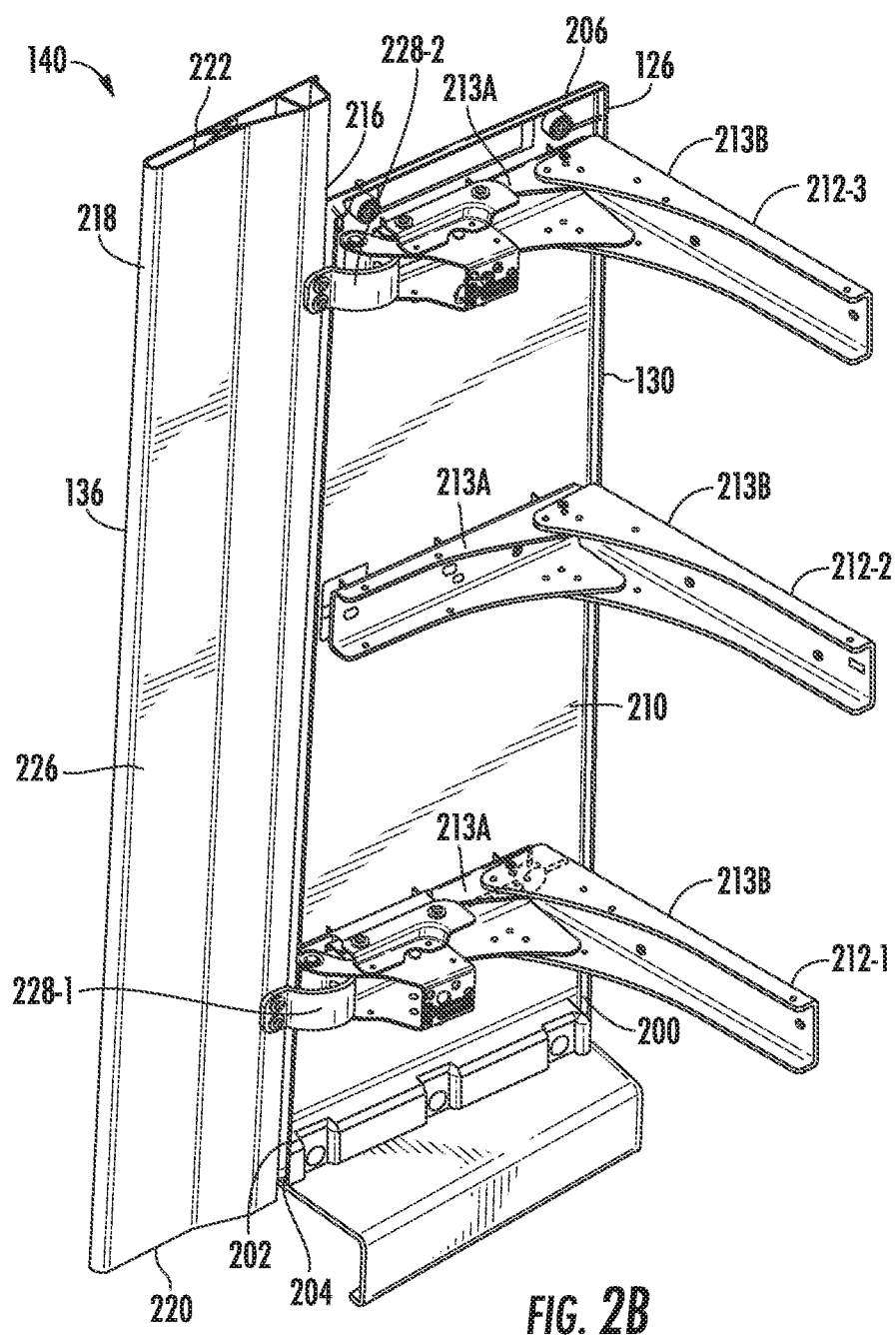
FIG. 2B is an inboard perspective view of the subassembly of the panel apparatus of FIG. 2A.

FIGS. 2A and 2B are views of the subassembly 140 of the panel apparatus 125 of FIG. 1. As noted above, the subassembly 140 of the panel apparatus 125 includes the lower portion 130 of the fixed panel 126 and the moveable panel extender 136 pivotally attached thereto. The fixed panel 126 and a hinge mechanism 228 are configured to be supported by a plurality of structural supports 212 attached to the rear wall 116 of the cab 108.

The fixed panel 126 includes a front edge 200, a rear edge 202, a bottom edge 204, a top edge 206, an outer surface 208, and an inner surface 210. In certain embodiments, the fixed panel 126 includes a plurality of structural supports 212 attached to the inner surface 210 of the fixed panel 126. The plurality of structural supports 212 includes a lower brace 212-1 (e.g., right angle bracket), a mid-brace 212-2 (e.g., right angle bracket), and an upper brace 212-3 (e.g., right angle bracket) (referred to generally as braces 212), although fewer or more braces could be used. The braces 212 attach the fixed panel 126 to the rear wall 116 of the cab 108 at a right angle thereto. Each brace 212 includes a first leg 213A attached to the fixed panel 126 and a second leg 213B configured to attach to the rear wall 116 of the cab 108. A length of the first leg 213A is positioned along the length of the fixed panel 126 and is about the length of the fixed panel 126.

The moveable panel extender 136 includes a front edge 216, a rear edge 218, a bottom edge 220, a top edge 222, an outer surface 224, and an inner surface 226. The moveable panel extender 136 is arranged rearward of the fixed panel 126 and is pivotally attached to the fixed panel 126 by a plurality of hinge mechanisms 228 (which may also be referred to as hinges). The hinge mechanisms 228 are configured to enable pivotal movement of the moveable panel extender 136 from a closed position in which the moveable panel extender 136 is substantially aligned with the fixed panel 126 to an open position in which the moveable panel extender 136 is pivoted outboard relative to the fixed panel 126. In certain embodiments, the hinge mechanisms 228 include gooseneck hinges.

The hinge mechanisms 228 include a lower hinge mechanism 228-1 and an upper hinge mechanism 228-2. The hinge mechanisms 228 are attached to the first leg 213A of the braces 212 and are attached to the inner surface 210 of the fixed panel 126 proximate to the rear edge 202, and are also attached to the inner surface 226 of the moveable panel extender 136 proximate to the front edge 216. In certain embodiments, the hinge mechanisms 228 are attached to the inner surface 210 of the fixed panel 126 (e.g., rigid plastic) and/or the inner surface 226 of the moveable panel extender 136 (e.g. resiliently deformable plastic) via one or more brackets (e.g., metal brackets, steel brackets, etc.). The braces 212 are positioned between the fixed panel 126 and the hinge mechanisms 228. As a result, the hinge mechanisms 228 are structurally supported by the brace 212 attached to the cab 108 (and the fixed panel 126 does not support the load of the hinge mechanisms 228). Attachment of the hinge mechanisms 228 to the inner surfaces 210, 226 provides for a seamless transition of the outer surface 208 of the fixed panel 126 and the outer surface 224 of the moveable panel extender 136 (e.g., for better aerodynamics). The hinge mechanisms 228 permit the moveable panel extender 136 to pivot outboard relative to the fixed panel 126.

In certain embodiments, the fixed panel 126 has a first length from a front edge 200 (e.g., first end) opposite the hinge mechanisms 228 to a rear edge 202 (e.g., second end) proximate to the hinge mechanisms 228. The moveable panel extender 136 has a second length from a front edge 216 (e.g., a first end) proximate to the hinge mechanisms 228 and a rear edge 218 (e.g., a second end) opposite the hinge mechanisms 228. The first length may be between 50% and 150% of the second length. In certain embodiments, the first length is about the same as the second length. In certain embodiments, the first length is about 12 inches (30.5 cm) and the second length is about 12 inches (30.5 cm).

A combined length of the fixed panel 126 and the moveable panel extender 136 is less than a length of the gap 124 between the cab 108 and the trailer 104 of the truck 102 when the cab 108 and the trailer 104 are aligned. When the cab 108 and the trailer 104 are aligned, a nonzero distance remains between the rear edge 218 of the moveable panel extender 136 and the front 120 of the trailer 104. In other words, there is no overlap between the moveable panel extender 136 of the panel apparatus 125 and the trailer 104. In certain embodiments, this distance remaining between the moveable panel extender 136 and the trailer 104 may be less than 14 inches (35.6 cm), less than 10 inches (25.4 cm), or less than 6 inches (15.2 cm). In certain embodiments, the distance should be short enough to maintain laminar flow from the cab 108 to the panel apparatus 125 to the trailer 104 (avoiding air streamline separation and eddy formation). In certain embodiments, the distance may be longer, such as due to fifth wheel movement.

When the trailer 104 is rotated relative to the cab 108 by about 90° (known as a "jackknife" condition), the combined length of the fixed panel 126 and the moveable panel extender 136 is greater than the gap between the trailer 104 and the cab 108, causing interference between the trailer 104 and the moveable panel extender 136 that results in deformation of the moveable panel extender 136.

Figure 3:
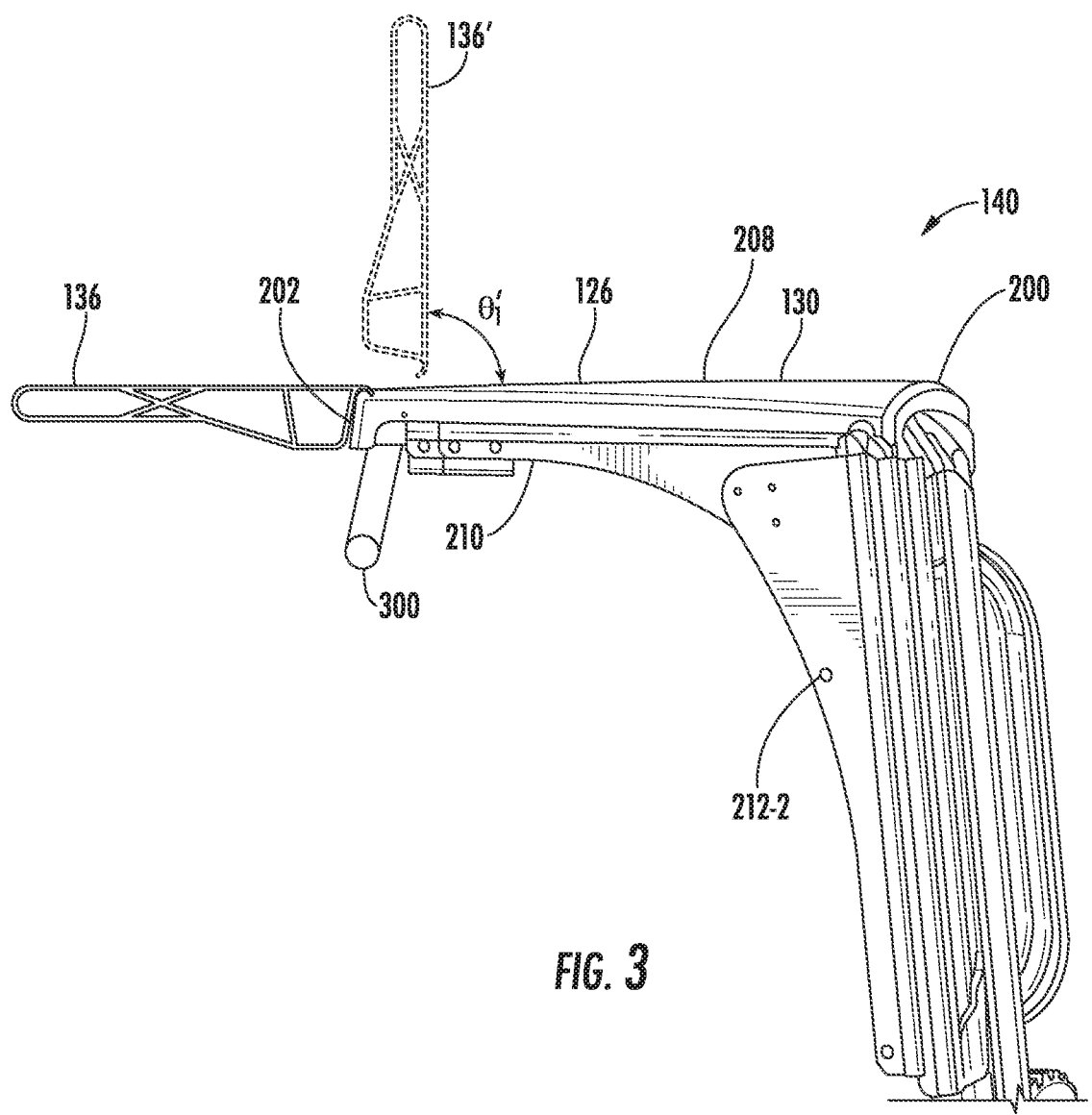
FIG. 3 is a top plan view of the subassembly of the panel apparatus of FIGS. 1-2B illustrating a moveable panel extender in a closed position (with the moveable panel extender illustrated in solid lines) and in an open position (with the moveable panel extended illustrated in dashed lines)

FIG. 3 illustrates a moveable panel extender 136 of the subassembly 140 of the panel apparatus 125 in a closed position and in an open position. In the closed position, a length of the moveable panel extender 136 is aligned (i.e., zero angle) with a length of the fixed panel 126. In other words, the outer surface 208 of the fixed panel 126 is aligned (i.e., zero angle) with the outer surface 224 of the moveable panel extender 136.

In the open position, the length of the moveable panel extender 136' is not aligned (i.e., non-zero angle $\Theta_1'$) with the length of the fixed panel 126. In other words, the outer surface 208 of the fixed panel 126 is not aligned (i.e., non-zero angle $\theta_1$.) with the outer surface 224 of the moveable panel extender 136. In certain embodiments, the moveable panel extender 136 can pivot 90° between a closed position and an open position. In certain embodiments, the moveable panel extender 136 can pivot more than 90° between a closed position and an open position.

The moveable panel extender 136 pivots outboard relative to the fixed panel 126. Such outboard movement of the moveable panel extender 136 from the closed position to the open position provides a user with access to a handle bar 300 attached to the inner surface 210 of the fixed panel 126 proximate to the rear edge 202 of the fixed panel 126. The moveable panel extender 136 is pivotable by a slight pull on a rear edge 218 of the moveable panel extender 136. Accordingly, the moveable panel extender 136 is easy to operate without training, levers, and/or locking mechanical components.

Figure 4A:
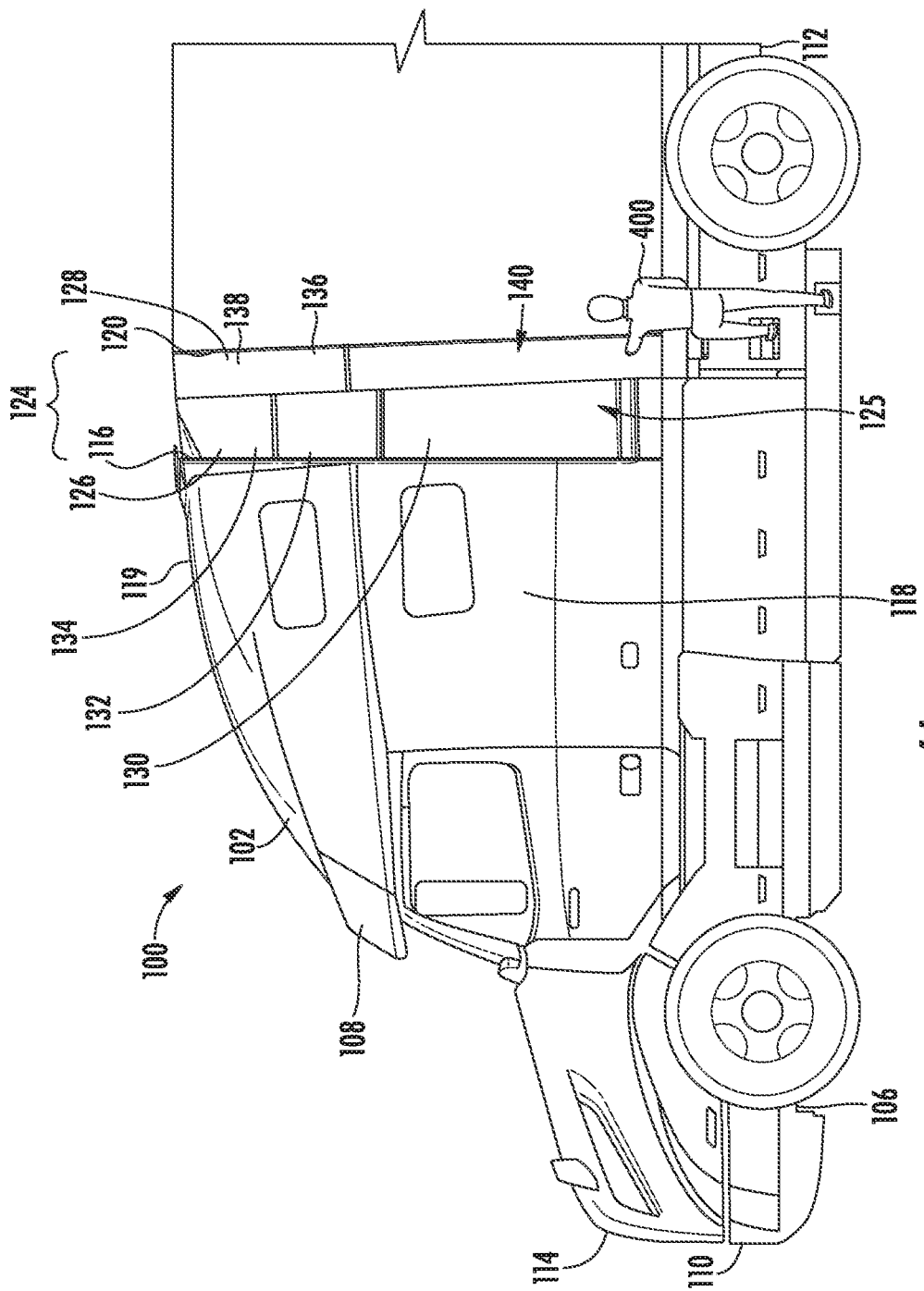
FIG. 4A is a side elevational view of the semi-trailer truck of FIG. 1 illustrating the moveable panel extender of FIGS. 1-3 in a closed position.
Figure 4B:
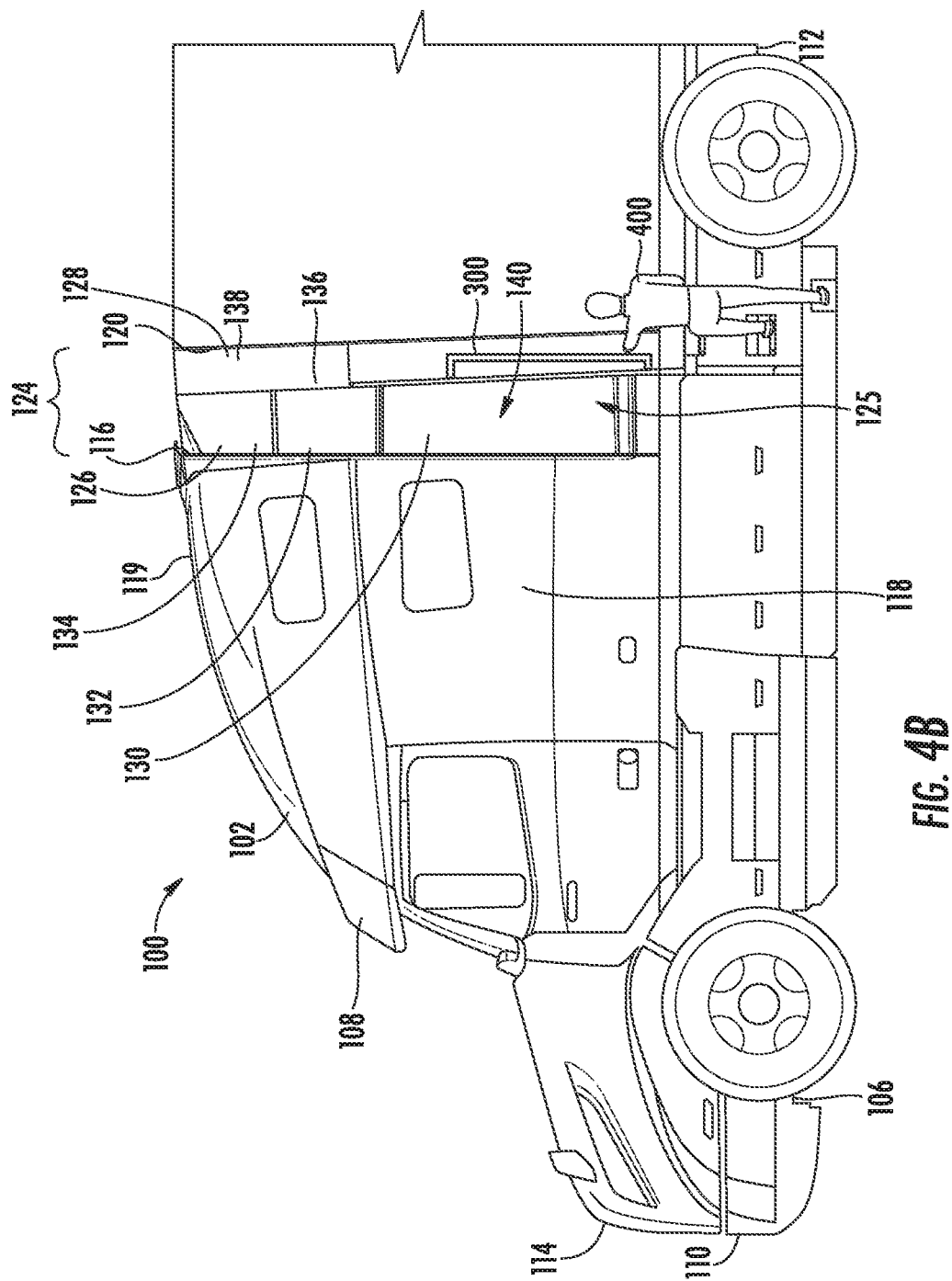
FIG. 4B is a side elevational view of the semi-trailer truck of FIG. 4A illustrating the moveable panel extender in an open position.

FIGS. 4A and 4B illustrate movement of the moveable panel extender 136 between the closed position and the open position. Referring to FIG. 4A, when the moveable panel extender 136 is in the closed position, the handle bar 300 is inaccessible to a user 400. Referring to FIG. 4B, when the user 400 moves the moveable panel extender 136 outboard to the open position, the handle bar 300 may be accessed by the user 400. It is noted that when the user 400 moves the moveable panel extender 136, the fixed panel 126 does not move.

Figure 5:
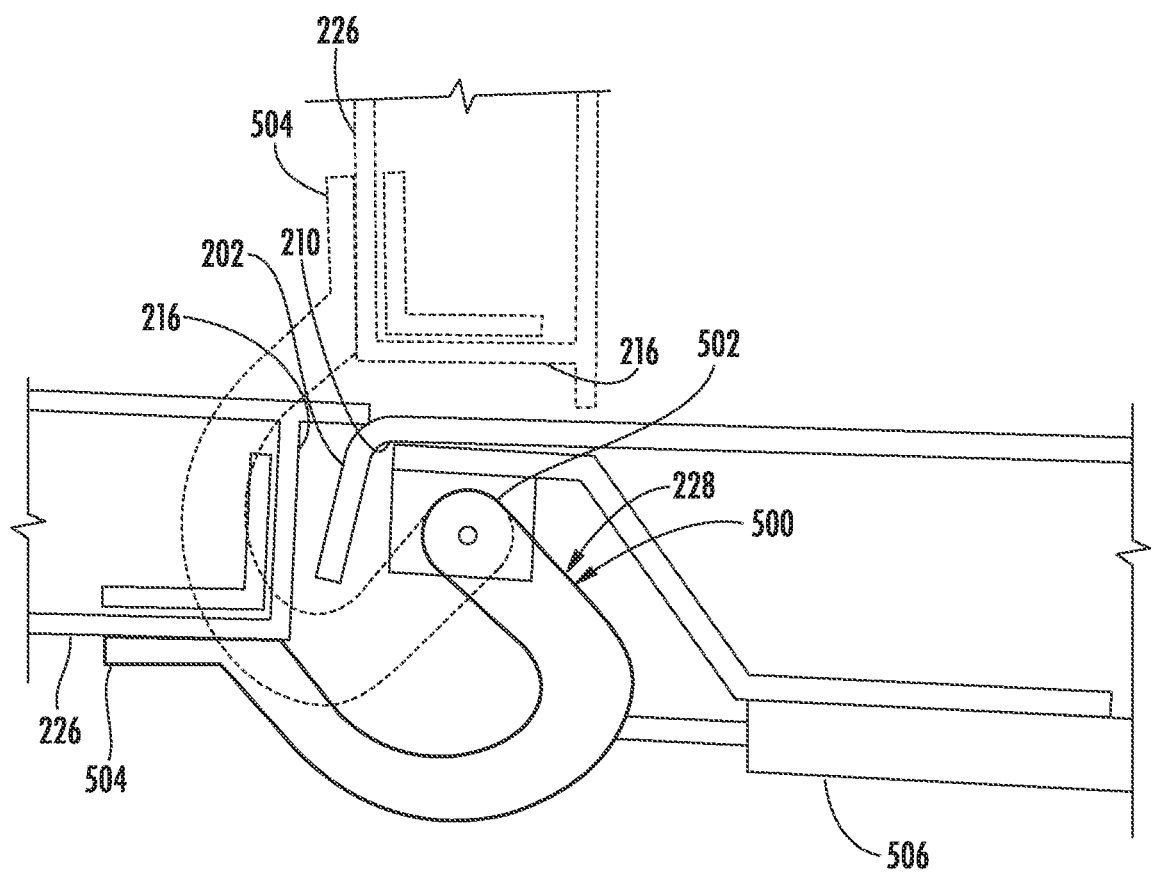
FIG. 5 is a top plan view of a hinge mechanism of the panel apparatus of FIGS. 1-2B illustrating movement of the hinge mechanism between the closed position (illustrated in solid lines) and the open position (illustrated in dashed lines)

FIG. 5 is a top view of the hinge mechanism 228 of the panel apparatus 125 of FIGS. 1-2B illustrating movement of the hinge mechanism 228 between the closed position and the open position. In certain embodiments, the hinge mechanism 228 includes a gooseneck hinge 500. The gooseneck hinge 500 includes a pivot end 502 and a rotating end 504. The pivot end 502 of the gooseneck hinge 500 is attached to the inner surface 210 of the fixed panel 126 proximate to the rear edge 202. The rotating end of the gooseneck hinge 500 is attached to the inner surface 226 of the moveable panel extender 136 proximate to the front edge 216. The design of the gooseneck hinge 500 provides for mounting of the hinge mechanism 228 at the inner surface 210 of the fixed panel 126 and the inner surface 226 of the moveable panel extender 136 while providing for a large angle of outboard pivotal movement of the moveable panel extender 136 relative to the fixed panel 126.

In certain embodiments, a gas strut 506 is attached to the gooseneck hinge 500 to provide tension (e.g., to keep the moveable panel extender closed) and/or to dampen movement and vibrations of the moveable panel extender 136 relative to the fixed panel 126.

It is noted that any of a variety of types of hinge mechanisms and/or hinges could be used. For example, in certain embodiments, the hinge mechanism 228 includes a biasing element (e.g., torsion spring) within a hinge housing to bias the gooseneck hinge 500 to a closed orientation. In such a configuration, the biasing element is not mounted or directly attached to the fixed panel 126.

Figure 6A:
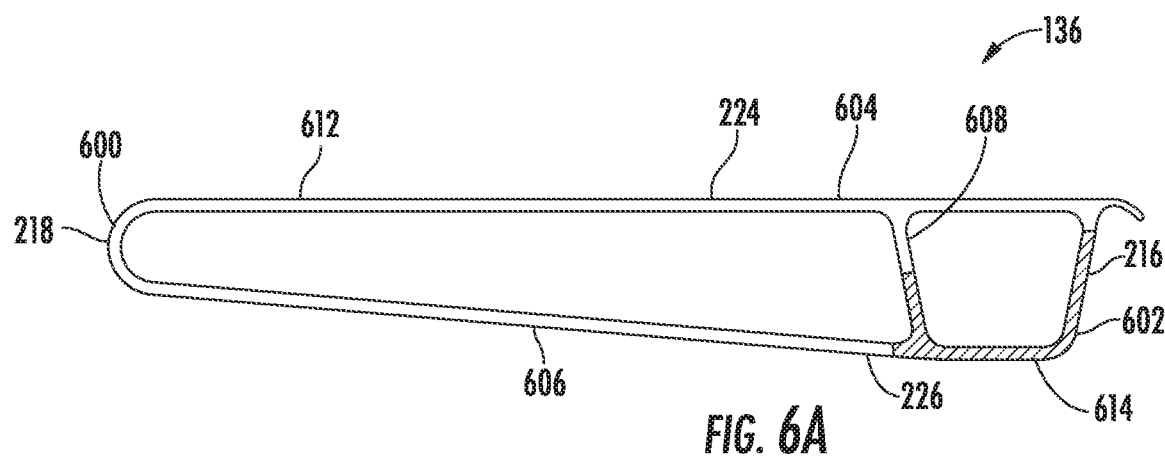
FIG. 6A is a cross-sectional view of the moveable panel extender of FIGS. 1-4B fabricated of an extruded material.

FIG. 6A is a cross-sectional view of the moveable panel extender 136 fabricated of an extruded material. As noted above, the moveable panel extender 136 includes a front edge 216, a rear edge 218, an outer surface 224, and an inner surface 226. Further, the moveable panel extender 136 includes a rear wall 600, a front wall 602, an outer wall 604, and an inner wall 606. The moveable panel extender 136 further includes a frontward cross-brace 608 extending between the outer wall 604 and the inner wall 606. At least a portion of a cross-section of the moveable panel extender 136 is hollow. In particular, the moveable panel extender 136 includes a plurality of hollow sections, thereby reducing the amount of force necessary to deform the moveable panel extender 136, and/or reducing the material and/or cost needed to form the moveable panel extender 136. In certain embodiments, the moveable panel extender 136 has a width (between the outer surface 224 and the inner surface 226) of about two inches (4.93 cm, 5.1 cm, etc.) and a length (between the front edge 216 and the rear edge 218) of about 12 inches (28.8 cm, 30.5 cm, etc.).

In certain embodiments, a first portion 612 of the moveable panel extender 136 is fabricated of a first material and a second portion 614 of the moveable panel extender 136 is fabricated of a second material, wherein the second material comprises a greater rigidity than the first material. The second portion 614 is proximate to the front edge 216 and the front wall 602, preferably being proximate to at least a portion of the inner wall 606 and/or a portion of the frontward cross-brace 608. As a result, the second portion 614 provides a more rigid point of attachment for the hinge mechanism 228 (see FIG. 2B), while the first portion 612 is more easily deformable. Therefore, the second portion 614 is proximate to the hinge mechanism 228 and the first portion 612 is arranged distal from the hinge mechanism 228.

Figure 6B:
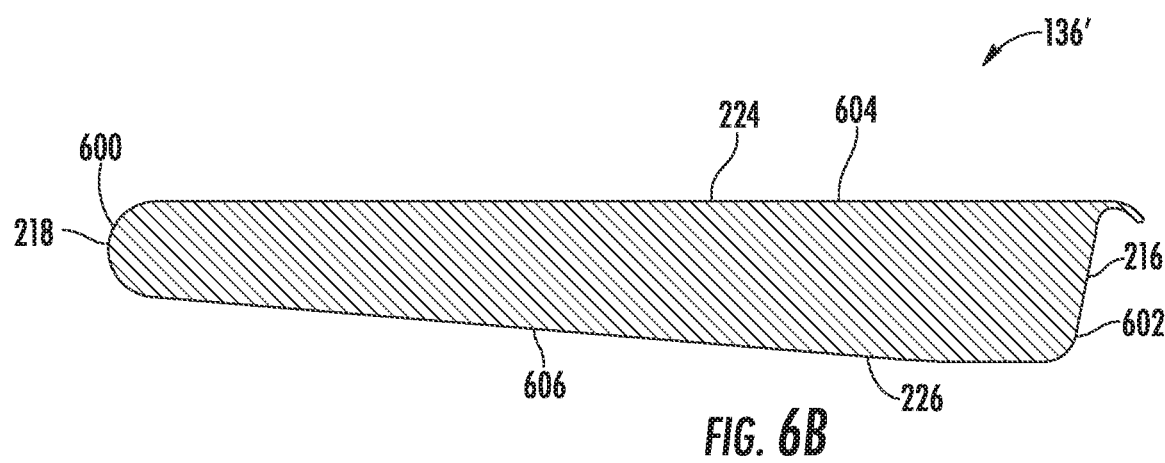
FIG. 6B is a cross-sectional view of the moveable panel extender of FIGS. 1-4B fabricated of a foam material.

FIG. 6B is a cross-sectional view of the moveable panel extender 136' according to one embodiment that is fabricated of a foam material. As noted above, the moveable panel extender 136' includes a front edge 216, a rear edge 218, an outer surface 224, and an inner surface 226. Further, the moveable panel extender 136' includes a rear wall 600, a front wall 602, an outer wall 604, and an inner wall 606. Unlike the moveable panel extender 136 of FIG. 6A, the moveable panel extender 136' is solid (not hollow). However, using the foam material makes the moveable panel extender 136' lighter. In certain embodiments, the foam material includes a cross-linked polyethylene foam, which may be fabricated by any suitable method such as injection molding with core and cavity tooling, and using nitrogen as a foaming agent.

Figure 7A:
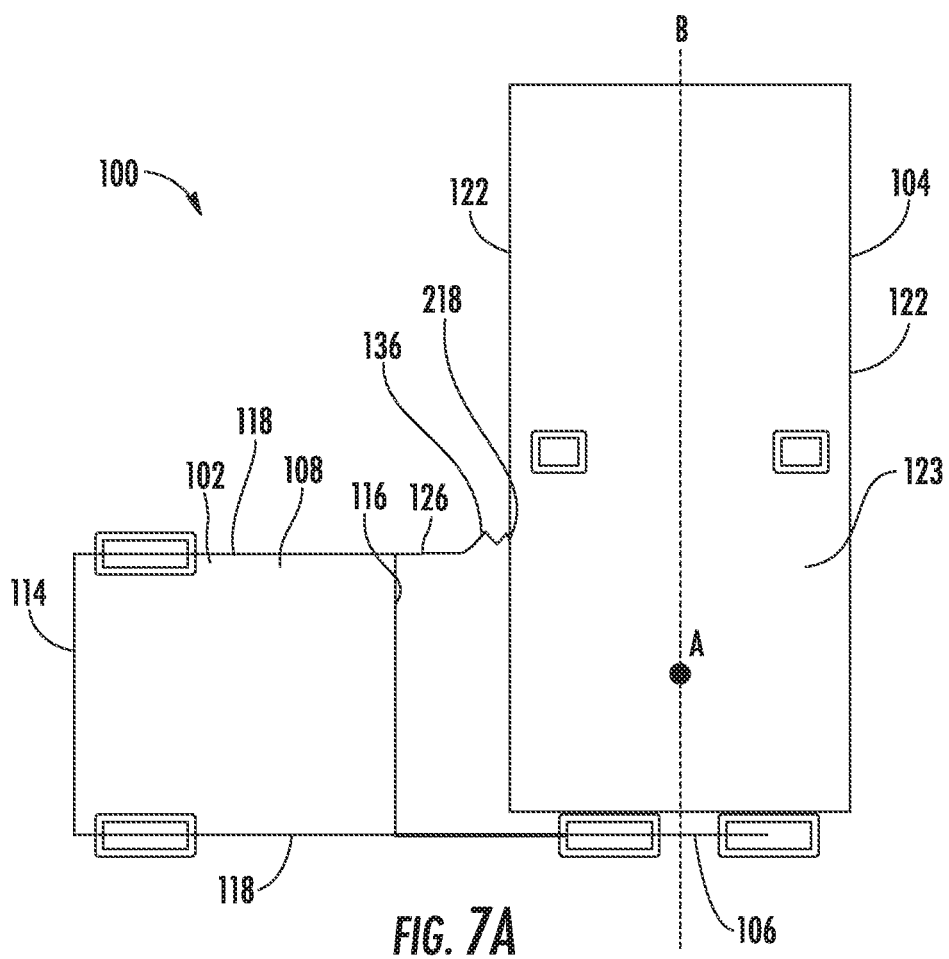
FIG. 7A is a top plan view of the semi-trailer truck of FIGS. 1 and 4A-4B illustrating deformation of the moveable panel extender due to trailer swing.
Figure 7B:
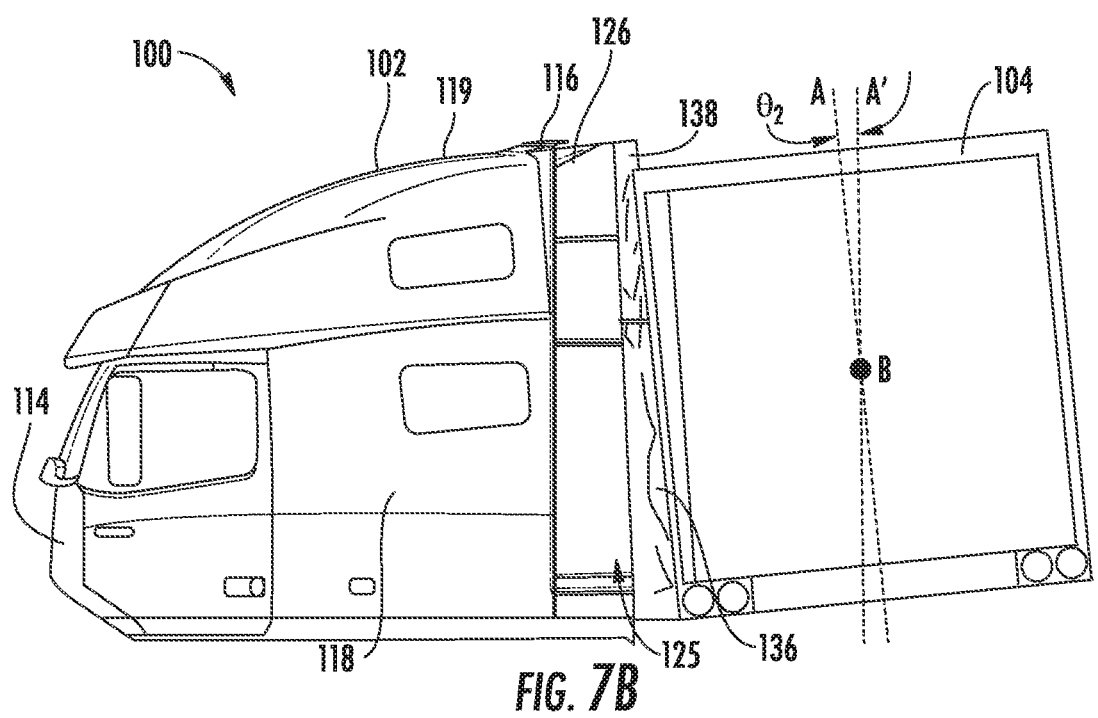
FIG. 7B is a side view of the semi-trailer truck of FIGS. 1 and 4A-4B illustrating deformation of the moveable panel extender due to trailer roll.

FIGS. 7A and 7B are views illustrating deformation of the resiliently moveable panel extender 136. Fabricating the moveable panel extender 136 of a resiliently deformable (e.g., crushable, deflectable) material enables the moveable panel extender 136 to extend rearward into an articulation interference zone between the trailer 104 and the cab 108 and be temporarily deformed when the trailer 104 is articulated relative to the cab 108, but return to shape after an articulation condition has ended.

FIG. 7A illustrates deformation of the moveable panel extender 136 from trailer swing. As noted above, the trailer 104 is pivotally mounted to the frame 106 of the truck 102 and rotates relative to the truck during steering events and may assume an angular orientation about a vertical axis A extending through the top 123 of the trailer 104. The vertical axis A is perpendicular to a horizontal axis B extending through the front 120 of the trailer 104. As the trailer 104 rotates about the vertical axis A relative to the cab 108, the rear edge 218 of the moveable panel extender 136 (and/or the fixed panel extender 138) contacts the sidewalls 122 of the trailer 104. As the trailer 104 continues to rotate relative to the cab 108, the moveable panel extender 136 (and/or the fixed panel extender 138) deforms, thereby allowing maximum rotation of the trailer 104 relative to the cab 108 (e.g., a 90° rotation of the cab 108 relative to the trailer 104) about the vertical axis A.

FIG. 7B illustrates deformation of the moveable panel extender 136 (and/or fixed panel extender 138) from trailer roll. When the trailer 104 is pivotally rotated relative to the cab 108 about the vertical axis A, the trailer 104 may additionally rotate (i.e., roll) about the horizontal axis B extending through the front 120 of the trailer 104. The length of the fixed panel 126 and/or moveable panel extender 136 is sufficient to allow additional deformation due to trailer roll $\theta_2$ (between vertical axis A of the trailer 104 and vertical axis A' relative to the ground). For example, in certain embodiments, the length of the fixed panel 126 and/or length of the moveable panel extender 136 are configured to allow for a 90° trailer swing and a 6° roll of the trailer 104. In certain embodiments, the lengths of the fixed panel 126 and/or the moveable panel extender 136 are 300 mm and can be deformed up to 250 mm.

Figure 8A:
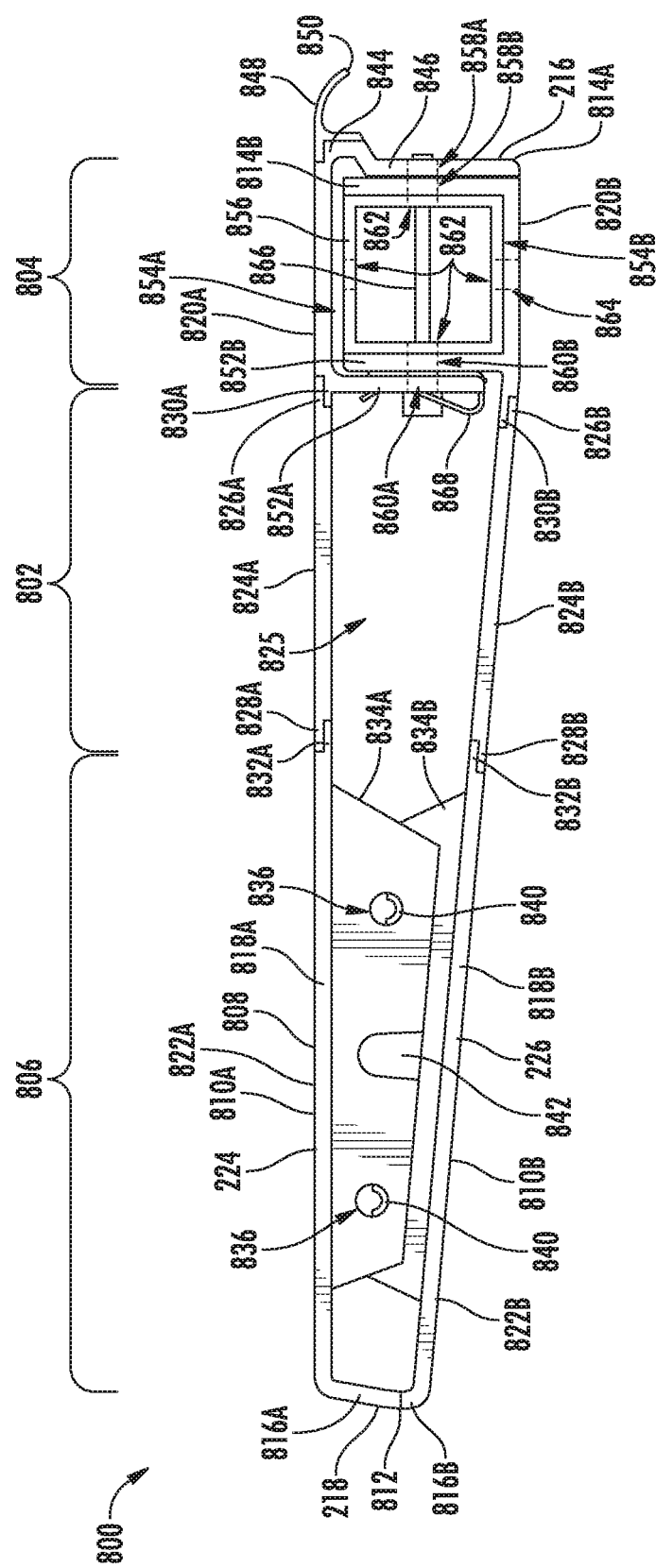
FIG. 8A is a top plan view of another embodiment of the moveable panel extender in a closed configuration with a flexible section positioned between a rigid frontward section and a rigid rearward section and configured to permit relative movement therebetween.
Figure 8B:
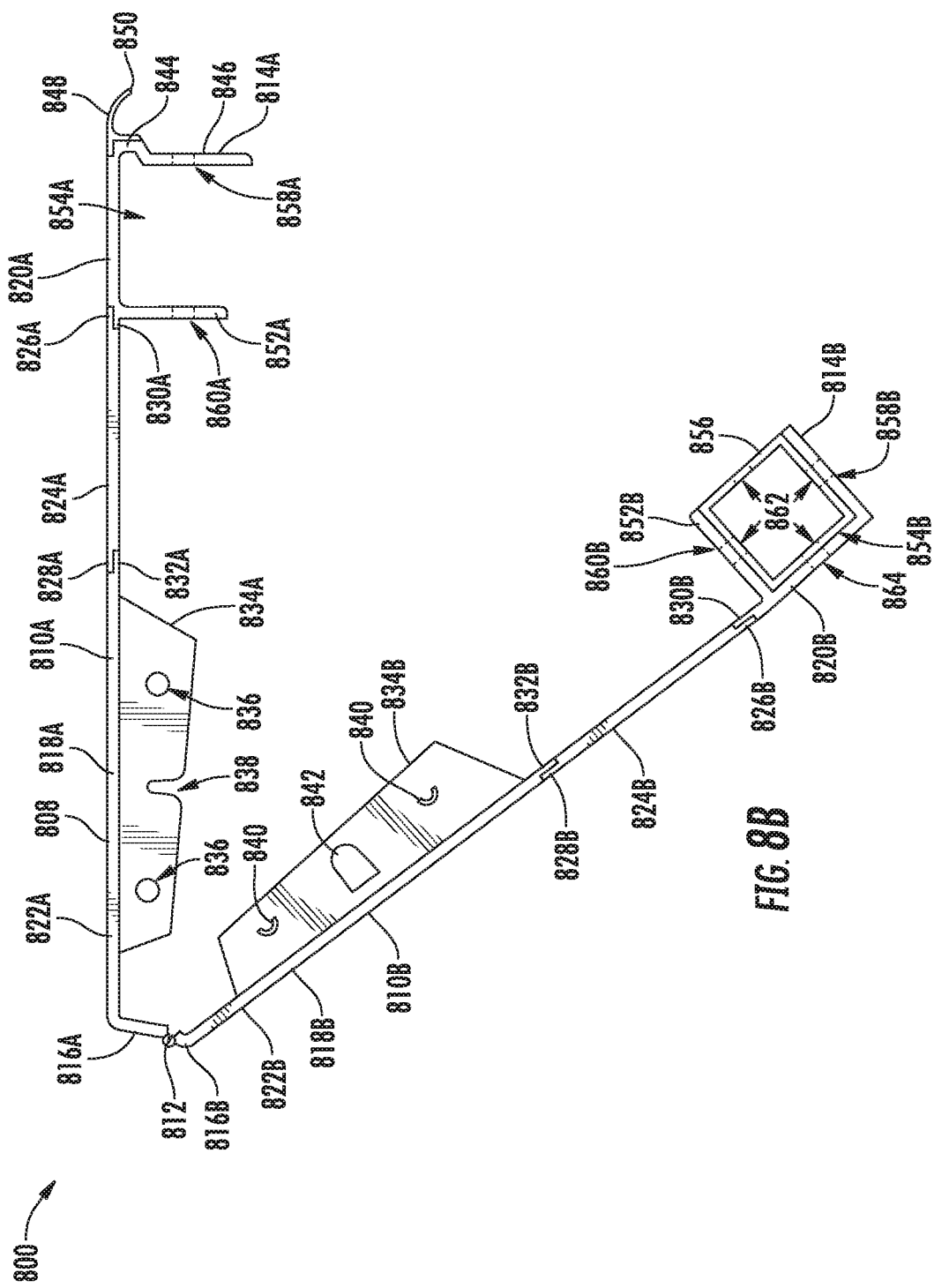
FIG. 8B is a top plan view of the moveable panel extender of FIG. 8A in an open configuration during assembly thereof.

FIGS. 8A-8C illustrate another embodiment of the moveable panel extender 800 with a flexible middle section 802 positioned between a rigid frontward section 804 and a rigid rearward section 806 and configured to permit relative movement therebetween. The moveable panel extender 800 includes similar features and operates similarly as the moveable panel extender 136 discussed above, particularly as part of the panel apparatus 125, except where otherwise noted below.

The moveable panel extender 800 includes a front edge 216, a rear edge 218, an outer surface 224 (which may also be referred to herein as an outboard surface), and an inner surface 226 (which may also be referred to herein as an inboard surface). At least a majority (e.g., more than 50%, more than 80%, more than 90%, more than 95%, etc.) of the frontward section 804 and the rearward section 806 includes a rigid material. The flexible middle section 802 includes a resiliently deformable material to permit relative movement of the rearward section 806 relative to the frontward section 804. In certain embodiments, the rigid material of the frontward section 804 and the rearward section 806 has a hardness of Shore 65D, and/or the resiliently deformable material has a hardness of Shore 65A. In certain embodiments, the rigid material and/or the resiliently deformable material include thermoplastics (e.g., thermoplastic vulcanizates (TPV)). In certain embodiments, the moveable panel extender 800 may be fabricated in a two shot injection molding process in which portions fabricated of a first material (i.e., one of the rigid material or the resiliently deformable material) are molded first, and other portions fabricated of a second material (i.e., the other of the rigid material or the resiliently deformable material) are molded over and in contact with the first material portions. In such a process, in certain embodiments, the rigid material and the resiliently deformable material portions bond to each other without any further processing or bonding materials. Use of rigid materials and resiliently deformable materials in the moveable panel extender 800 may provide several advantages over an extrusion process. For example, using a combination of rigid materials and resiliently deformable materials reduces the effect of deformation over time of use (e.g., due to air flow). Further, compared to extrusion, injection molding may provide better quality control in the manufacture of the moveable panel extender 800 as there is increased dimensional stability and/or surface quality (e.g., the surfaces are smoother and more aerodynamic).

The moveable panel extender 800 includes a body 808 (which may be fabricated as a clamshell assembly) having an outboard portion 810A and an inboard portion 810B attached to one another by a living hinge 812 at the rear edge 218.

The outboard portion 810A includes a front wall 814A, a rear wall 816A, and an outer wall 818A extending therebetween. The outer wall 818A includes a front rigid segment 820A, a rear rigid segment 822A, and a middle flexible segment 824A positioned therebetween. Similarly, the inboard portion 810B includes a front wall 814B, a rear wall 816B, and an inner wall 818B extending therebetween. The inner wall 818B includes a front rigid segment 820B, a rear rigid segment 822B, and a middle flexible segment 824B positioned therebetween. Accordingly, the front edge 216 of the moveable panel extender 800 is at least partially defined by the front wall 814A of the outboard portion 810A and the front wall 814B of the inboard portion 810B, which are connected to each other by the living hinge 812. The rear edge 218 is at least partially defined by the rear wall 816A of the outboard portion 810A and the rear wall 816B of the inboard portion 810B. The outer surface 224 is defined by the front rigid segment 820A, the rear rigid segment 822A, and the middle flexible segment 824A of the outboard portion 810A. The inner surface 226 is defined by the front rigid segment 820B, the rear rigid segment 822B, and the middle flexible segment 824B of the inboard portion 810B.

In certain embodiments, the body 808 includes a hollow portion 825 positioned between the outer wall 818A and the inner wall 818B. At least a portion of a cross-section of the moveable panel extender 800 is hollow, thereby reducing the weight, reducing the amount of force necessary to deform the moveable panel extender 800, and/or reducing the material and/or cost needed to fabricate the moveable panel extender 800. In certain embodiments, the moveable panel extender 800 has a width (between the outer surface 224 and the inner surface 226) of two inches (5.1 cm) and a length (between the front edge 216 and the rear edge 218) in a range of from about 20 cm to about 40 cm, or a length of about 12 inches (30.5 cm).

The middle flexible segment 824A of the outboard portion 810A includes opposing stepped vertical edges 826A, 828A that mate respectively with a stepped vertical edge 830A of the front wall 814A, and a stepped vertical edge 832A of the rear wall 816A. The stepped edges 826A, 828A, 830A, 832A provide increased surface area for adhering the middle flexible segment 824A to the front wall 814A and the rear wall 816A while also maintaining a smooth outer surface 224. Similarly, the middle flexible segment 824B of the inboard portion 810B includes opposing stepped vertical edges 826B, 828B that mate respectively with a stepped vertical edge 830B of the front wall 814B, and a stepped vertical edge 832B of the rear wall 816B. The stepped edges 826B, 828B, 830B, 832B provide increased surface area for adhering the middle flexible segment 824B to the front wall 814B and the rear wall 816B while also maintaining a smooth inner surface 226.

The outboard portion 810A of the body 808 of the moveable panel extender 800 further includes at least one outboard rib 834A inwardly extending (i.e., extending inboard) from the rear rigid segment 822A of the outer wall 818A. The at least one outboard rib 834A further includes two through-holes 836 and a slot 838 positioned therebetween (see FIGS. 8B and 8C). Similarly, the inboard portion 810B of the body 808 of the moveable panel extender 800 further includes at least one inboard rib 834B inwardly extending (i.e., extending outboard) from the rear rigid segment 822B of the inner wall 818B. The at least one inboard rib 834B further includes two tapered protrusions 840 and a T-fastener 842 positioned therebetween. When the outboard portion 810A and the inboard portion 810B are in a closed position, the ribs 834A and 834B are configured to be positioned proximate to one another, and as shown, the ribs overlap. Further, the two tapered protrusions 840 are configured to protrude through or into the through-holes 836, and the T-fastener 842 is configured to be positioned within the slot 838. In other words, the at least one outboard rib 834A and the at least one inboard rib 834B are configured to detachably connect to one another. The tapered protrusion 840 assists assembly of the outboard portion 810A and the inboard portion 810B from an open orientation to a closed configuration. The living hinge 812 aids in alignment of these engagement features of the ribs 834A, 834B with one another. However, in certain embodiments, the living hinge 812 may be omitted, and the body 808 may comprise a two-piece assembly.

The front wall 814A of the outboard portion 810A includes an outboard extension 844 and an inboard recession 846, where the outboard extension 844 is positioned further forward than the inboard recession 846. The outboard portion 810A of the body 808 of the moveable panel extender 800 further includes a tab 848 forwardly extending from the outboard extension 844 of the front wall 814A and/or the front rigid segment 820A of the outer wall 818A. The tab 848 includes the resiliently deformable material and is configured to extend over and cover the gap between the moveable panel extender 800 and the fixed panel 126. The offset of the outboard extension 844 relative to the inboard recession 846 provides clearance between the front wall 814A and the fixed panel 126 while also minimizing the gap between the front wall 814A of the moveable panel extender 800 and the fixed panel 126. The tab 848 may be curved and inwardly biased (i.e., biased inboard) so that when the moveable panel extender is in the closed position, the front end 850 of the tab 848 contacts and maintains contact with the fixed panel 126. Thus, the tab 848 increases the aesthetic appeal of the panel apparatus 125, while also increasing aerodynamic performance.

The moveable panel extender 800 includes additional features to provide torsional strength of the moveable panel extender 800. The outboard portion 810A of the body 808 of the moveable panel extender 800 further includes a frontward cross-brace 852A inwardly extending (i.e., extending inboard) from the front rigid segment 820A of the outer wall 818A of the outboard portion 810A of the body 808. The frontward cross-brace 852A is generally parallel to the front wall 814A of the outboard portion 810A. In this way, the front wall 814A, the frontward cross-brace 852A, and the front rigid segment 820A of the outer wall 818A form a channel 854A (e.g., U-shaped channel). Similarly, the inboard portion 810B of the body 808 of the moveable panel extender 800 further includes a frontward cross-brace 852B outwardly extending (i.e., extending outboard) from the front rigid segment 820B of the inner wall 818B of the inboard portion 810B of the body 808. The frontward cross-brace 852B is generally parallel to the front wall 814B of the inboard portion 810B. In this way, the front wall 814B, the frontward cross-brace 852B, and the front rigid segment 820B of the inner wall 818B form a channel 854B (e.g., U-shaped channel).

The moveable panel extender 800 further includes a spine 856 (which may also be referred to as a tube) with a rectangular cross-section (e.g., square cross-section). In certain embodiments the spine 856 is a hollow tube with a square cross-section. In certain embodiments, the spine 856 is made of metal (e.g., aluminum). The spine 856 is positioned in the channel 854B of the inboard portion 810B, between the frontward cross-brace 852B and the front wall 814B of the inboard portion 810B. In the closed configuration, the spine 856, the frontward cross-brace 852B, and the front wall 814B are positioned between the frontward cross-brace 852A and the front wall 814A. Such a configuration provides torsional strength to the moveable panel extender 800, particularly when the moveable panel extender 800 is moved between the closed position and the open position relative to the fixed panel 126. Similarly, the frontward cross-braces 852A, 852B also provide torsional strength and structural rigidity.

To fasten the outboard portion 810A of the body 808 to the inboard portion 810B of the body 808, the front wall 814A includes at least one through-hole 858A, the frontward cross-brace 852A includes at least one through-hole 860A, the front wall 814B includes at least one through-hole 858B, the frontward cross-brace 852B includes at least one through-hole 860B, and the spine 856 includes through-holes 862 positioned in each of the four walls of the spine 856, such that two pairs of the through-holes 862 are aligned with and opposed to one another. The square cross-section of the spine 856 and rotational symmetry of the through-holes 862 in the spine 856 mean that the spine 856 can be positioned within the channel 854B in any of four rotational positions.

The moveable panel extender 800 further includes at least one bolt 866 and at least one J-nut 868 (which may also be referred to as a spring nut) attached to the frontward cross-brace 852A and aligned with the at least one through-hole 860A. In the closed configuration, the through-holes 858A, 860A, 858B, 860B, 862 (i.e., two of the four through-holes 862) all align with one another along a common axis and at least one bolt 866 is inserted therethrough and threadably engages at least one J-nut 868. It is noted that this assembly of the frontward section 804 can be disassembled without disassembling the ribs 834A, 834B of the rearward section 806 due to the resiliently deformable material of the flexible middle section 802. Further, it is noted that the living hinge 812 is positioned closer to the inner surface 226 than the outer surface 224 of the body 808 of the moveable panel extender 800. This configuration moves the axis of rotation inboard and aids in rotatable assembly of the frontward cross-brace 852B, and the front wall 814B of the inboard portion 810B between the frontward cross-brace 852A and the front wall 814A of the outboard portion 810A.

The inner wall 818B of the inboard portion 810B of the body 808 includes at least one through-hole 864 which aligns with one of the through-holes 862 of the spine 856 for fastening the moveable panel extender 800 to the fixed panel 126.

FIG. 9A is a top plan view of another embodiment of the panel apparatus 125 of FIGS. 1-2B with the moveable panel extender of FIGS. 8A-8C. As noted above, the panel apparatus 125 includes a fixed panel 126 and the moveable panel extender 800 is pivotable in an outboard direction. The moveable panel extender 800 further includes at least one rivet nut 900 positioned in the through-hole 862 of the spine 856 proximate the inner wall 818B of the inboard portion 810B of the body 808. A bolt 902 is inserted through the gooseneck hinge 500 (although hinges of other types may be used in certain embodiments), through the through-hole 864 of the inner wall 818B and into the rivet nut 900 to mount the moveable panel extender 800 to the fixed panel 126.

FIG. 9B is a top plan view of the panel apparatus 125 of FIG. 9A illustrating deformation of the moveable panel extender 800 due to trailer swing. As similarly discussed above with respect to FIGS. 7A-7B, as the trailer 104 rotates relative to the cab 108, the rear edge 218 of the moveable panel extender 136 (and/or fixed panel extender 138) contacts the sidewalls 122 of the trailer 104. As the trailer 104 continues to rotate relative to the cab 108, the moveable panel extender 800 (and/or fixed panel extender 138) deforms, thereby allowing maximum rotation of the trailer 104 relative to the cab 108 (e.g., a 90° rotation of the cab 108 relative to the trailer 104). The flexible middle section 802 deforms, thereby permitting movement of the frontward section 804 relative to the rearward section 806. Similar deformation may be experienced by deformation of the moveable panel extender 800 from trailer roll. For example, in certain embodiments, the length of the fixed panel 126 and/or length of the moveable panel extender 136 are configured to allow for a 90° trailer swing and a 6° roll of the trailer 104. In certain embodiments, the lengths of the fixed panel 126 and/or the moveable panel extender 136 are 300 mm and can be deformed up to 250 mm.

FIG. 10 is a plan view of another embodiment of the moveable panel extender 800' of FIG. 8A with a skin 1000 on exterior surface portions thereof to provide a uniform aesthetic appearance. The moveable panel extender 800' includes similar features and operates similarly as the moveable panel extender 800 of FIGS. 8A-9B, except where otherwise noted. The body 808 of the moveable panel extender 800' includes a skin 1000 at an outer surface 224 of the body 808, and extending from a front edge 216 to a rear edge 218 of the body 808. The skin 1000 is integral to the body 808 and includes the resiliently deformable material. The skin 1000 provides a uniform appearance of the moveable panel extender 800', while also providing the resiliently deformable material of the flexible middle section 802. Accordingly, the skin 1000 and the flexible middle section 802 are integrally connected to one another. However, in certain embodiments, the skin 1000 is made of different material than the flexible middle section 802.

In this way, the moveable panel extender 136 is deformable during articulation of the trailer 104, but then returns to its original shape after the trailer 104 returns to the straight orientation relative to the cab 108.

Figure 11A:
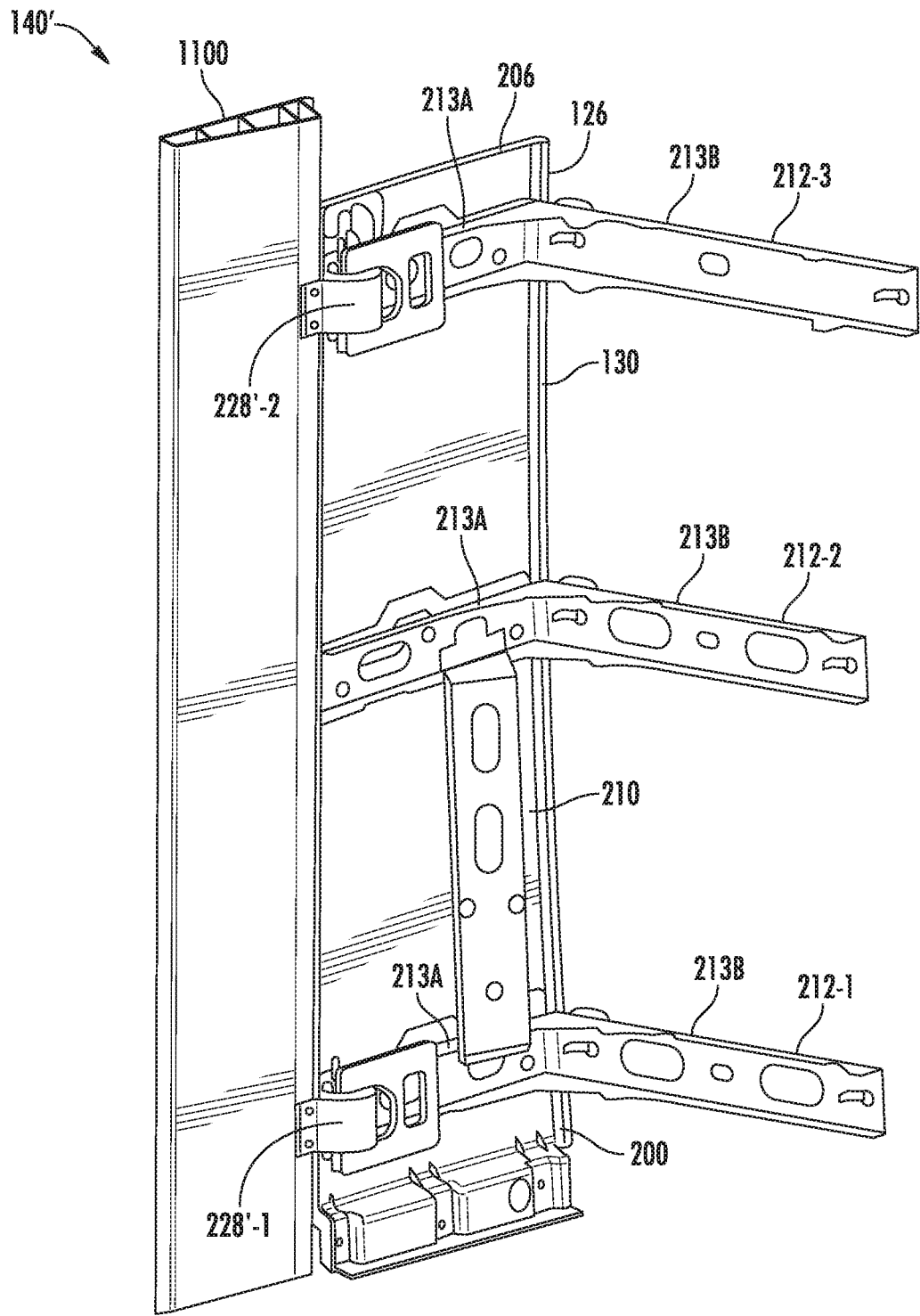
FIG. 11A is an inboard perspective view of another embodiment of the subassembly of the of the panel apparatus of FIGS. 2A-2B.
Figure 11B:
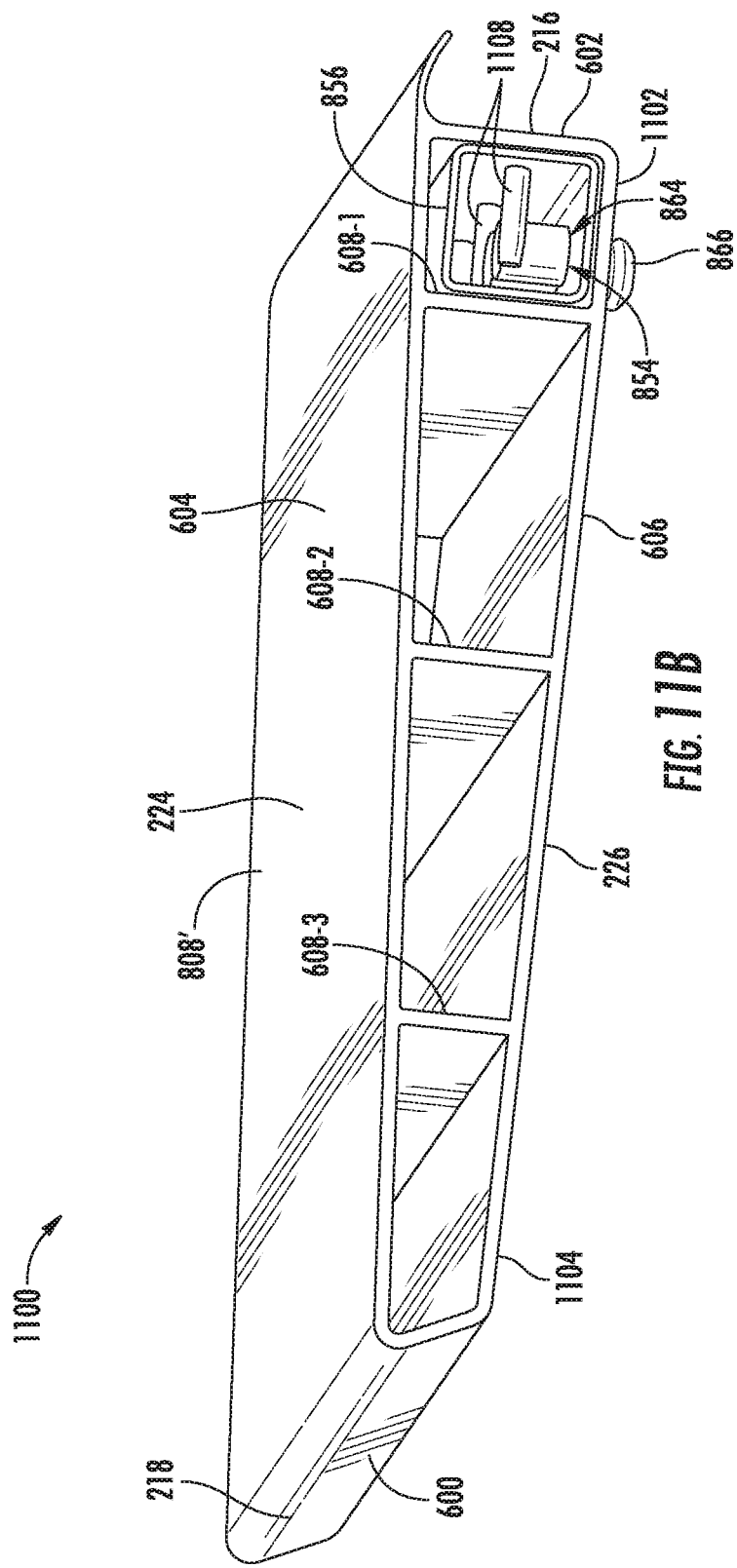
FIG. 11B is a perspective view of another embodiment of the moveable panel extender of FIG. 11A fabricated from two differing extruded materials.
Figure 11C:
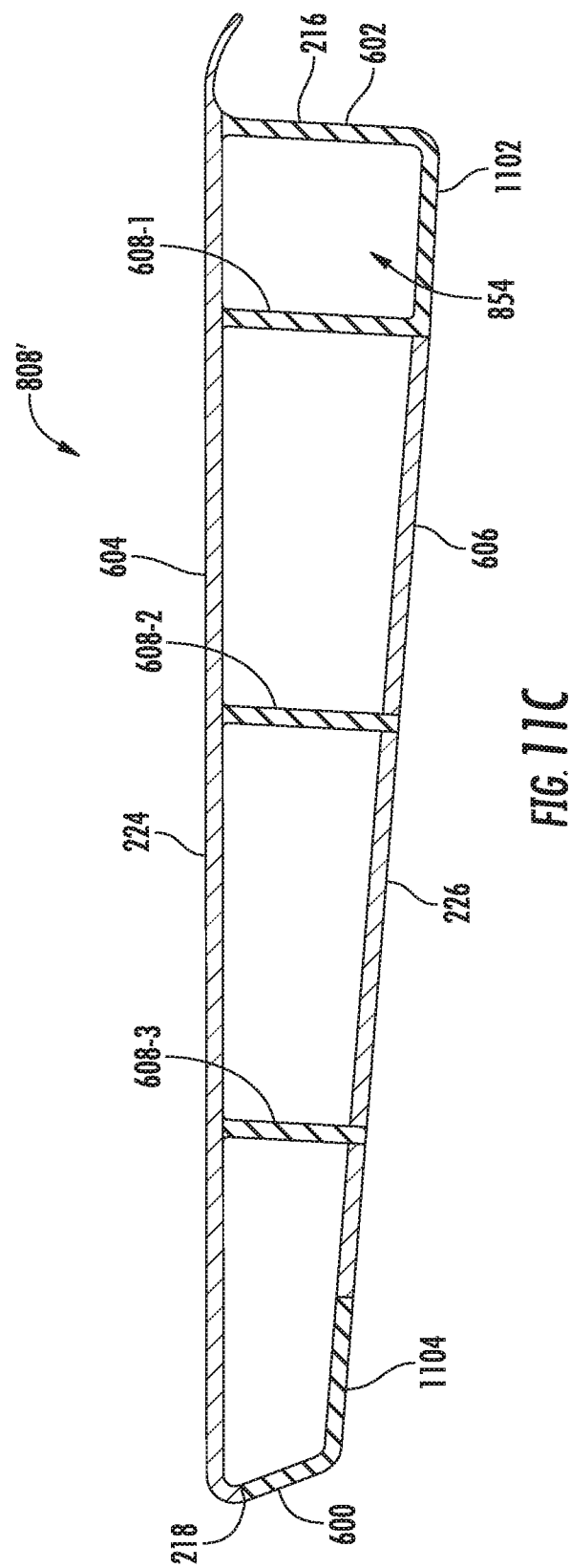
FIG. 11C is a cross-sectional view of the moveable panel extender of FIG. 11B fabricated of two differing extruded materials.

FIGS. 11A-11C are views of another embodiment of the subassembly of the panel apparatus 125 and the moveable panel extender 136. Referring to FIG. 11A, the subassembly 140' includes similar features as those discussed above, except where otherwise noted. In certain embodiments, as discussed above, the hinge mechanism 228' includes a biasing element (e.g., torsion spring) within a hinge housing to bias the gooseneck hinge 500 to a closed orientation. Of course, other types of hinge mechanisms could be used. Further, the subassembly 140' includes a fixed panel 126 and a moveable panel extender 1100 pivotally attached thereto.

In certain embodiments, the moveable panel extender 1100 is configured to open and close with approximately 5-20 lbs of force. In certain embodiments, the moveable panel extender 1100 is configured to open and close with approximately 10-15 lbs of force. In certain embodiments, the moveable panel extender 1100 is configured to open and close with approximately 13 lbs of force. In certain embodiments, such force is split between the two hinge mechanisms 228'. In certain embodiments, such force is provided in one hinge mechanism 228'-1 and a second hinge mechanism 228'-2 is allowed to freely move (e.g., without spring tension).

FIGS. 11B-11C are views of the moveable panel extender 1100. The moveable panel extender 1100 includes similar features and operates similarly as the moveable panel extenders discussed above, particularly as part of the panel apparatus 125, except where otherwise noted below.

The moveable panel extender 1100 includes a front edge 216, a rear edge 218, an outer surface 224 (which may also be referred to herein as an outboard surface), and an inner surface 226 (which may also be referred to herein as an inboard surface). Further, the moveable panel extender 1100 includes a rear wall 600, a front wall 602, an outer wall 604, and an inner wall 606. The moveable panel extender 1100 further includes a plurality of cross-braces 608 (including a frontward cross-brace 608-1, a mid-cross-brace 608-2, and a rearward cross-brace 608-3) extending between the outer wall 604 and the inner wall 606.

In certain embodiments, at least a portion of the outer wall 604, and the inner wall 606 are fabricated of a first material (e.g., a rigid material), and at least a portion of the rear wall 600, font wall 602, outer wall 604, plurality of cross-braces 608, and/or a portion of the inner wall 606 are fabricated of a second material (e.g., a resiliently deformable material) having a greater rigidity (e.g., different Shore hardness) than the first material.

In certain embodiments, a frontward portion 1102 of the inner wall 606 proximate the front wall 602 is fabricated from the second material, and a rearward portion 1104 of the inner wall 606 proximate the rear wall 600 is fabricated from the second material. In certain embodiments, the rigid material has a hardness of Shore 65D, and/or the resiliently deformable material has a hardness of Shore 65A. In certain embodiments, the rigid material and/or the resiliently deformable material include thermoplastics (e.g., thermoplastic vulcanizates (TPV)).

The rearward portion 1104 provides a contact surface for contacting the trailer 104 to reduce wear on the moveable panel extender 1100. The cross-braces 608-1-608-3 provide sufficient structure for the moveable panel extender 1100 to hold and push the air properly along a side of the vehicle, while also allowing the inner wall and/or the outer wall to bend.

Referring to FIG. 11B, the frontward cross-brace 608-1 is generally parallel to the front edge 216. The front wall 602, frontward cross-brace 608, and frontward portion of the inner wall 606 form a channel 854 (e.g., U-shaped channel). The moveable panel extender 1100 further includes a spine 856 (which may also be referred to as a tube) with a square cross-section positioned in the channel 854 of the body 808', as similarly discussed above. In certain embodiments, the moveable panel extender 1100 includes rivets 1108 (e.g. blind rivets) to attach the spine 856 to the body 808'.

The spine 856 is positioned in the channel 854 of the body 808' to provide torsional strength of the moveable panel extender 1100, particularly when the moveable panel extender 1100 is moved between the closed position and the open position relative to the fixed panel 126. Similarly, the cross-braces 608-1, 608-2, and 608-3 also provide torsional strength and structural rigidity.

The inner wall 606 of the body 808' includes at least one through-hole 864 which aligns with one of the through-holes 862 of the spine 856 for fastening the moveable panel extender 800 to the fixed panel 126. Accordingly, the moveable panel extender 800 further includes at least one bolt 866 and at least one nut (e.g., J-nut, Riv-nut, etc.) attached to the frontward portion 1102.

In certain embodiments, the moveable panel extender 1100 is formed by extrusion using different polymers with different shore hardnesses. In certain embodiments, the moveable panel extender 1100 includes a slip coat to provide an improved appearance.

Those skilled in the art will recognize improvements and modifications to the preferred embodiments of the present disclosure. All such improvements and modifications are considered within the scope of the concepts disclosed herein and the claims that follow.

What is claimed is:

1. A panel apparatus configured to be mounted behind a cab of a truck, the panel apparatus comprising:
   a fixed panel;
   a moveable panel extender arranged rearward of the fixed panel; and
   a hinge mechanism configured to enable pivotal movement of the moveable panel extender from a closed position in which the moveable panel extender is substantially aligned with the fixed panel to an open position in which the moveable panel extender is pivoted outboard relative to the fixed panel;
   wherein the fixed panel and the hinge mechanism are configured to be supported by a plurality of structural supports attached to a rear wall of the cab, with the fixed panel being immovable relative to the cab.

2. The panel apparatus of claim 1, wherein a combined length of the fixed panel and the moveable panel extender is less than a length of a gap between the cab of the truck and a trailer of the truck when the cab and the trailer are aligned.

3. The panel apparatus of claim 1, wherein the fixed panel comprises a rigid material and the moveable panel extender comprises a resiliently deformable material.

4. The panel apparatus of claim 1, wherein the fixed panel comprises a plastic material.

5. The panel apparatus of claim 3, wherein the resiliently deformable material comprises rubber.

6. The panel apparatus of claim 5, wherein the rubber comprises at least one of a thermoplastic elastomer (TPE), a thermoplastic vulcanizate (TPV), and a thermoplastic olefin (TPO).

7. The panel apparatus of claim 6, wherein the resiliently deformable material comprises a thermoplastic vulcanizate (TPV).

8. The panel apparatus of claim 4, wherein the moveable panel extender comprises an extruded material.

9. The panel apparatus of claim 4, wherein at least a portion of a cross-section of the moveable panel extender is hollow.

10. The panel apparatus of claim 4, wherein a first portion of the moveable panel extender comprises a first material and a second portion of the moveable panel extender comprises a second material, and wherein the second material comprises a greater rigidity than the first material.

11. The panel apparatus of claim 1, wherein the moveable panel extender has a length in a range of from about 20 cm to about 40 cm.

12. The panel apparatus of claim 1, wherein:
   the fixed panel has a first length extending from a first end of the fixed panel opposite the hinge mechanism to a second end of the fixed panel proximate to the hinge mechanism;
   the moveable panel extender has a second length extending from a first end of the moveable panel proximate to the hinge mechanism to a second end of the moveable panel opposite the hinge mechanism; and
   the first length is in a range of from about 50% to about 150% of the second length.

13. The panel apparatus of claim 1, wherein:
the fixed panel comprises a lower portion and an upper portion; and
the moveable panel extender is attached to the lower portion and not attached to the upper portion.

14. The panel apparatus of claim 13, wherein the moveable panel extender has a height that is greater than a height of the lower portion of the fixed panel.

15. The panel apparatus of claim 1,
further comprising a fixed panel extender comprising a resiliently deformable material;
wherein the moveable panel extender comprises the resiliently deformable material.

16. The panel apparatus of claim 15, wherein the fixed panel extender and the moveable panel extender have a same length and differing heights.

17. The panel apparatus of claim 1, wherein the hinge mechanism comprises a gooseneck hinge.

18. The panel apparatus of claim 1, wherein the hinge mechanism is attached to an inner surface of the fixed panel and to an inner surface of the moveable panel extender.

19. The panel apparatus of claim 18, wherein the panel extender comprises a metal spine at a frontward section.

20. The panel apparatus of claim 19, wherein the metal spine comprises a hollow tube with a rectangular cross-section.

21. The panel apparatus of claim 20, wherein a body of the moveable panel extender further comprises an outer wall, an inner wall, and at least one hollow portion positioned between the outer wall and the inner wall.

* * * * *